United States Patent
Gudigopuram et al.

(10) Patent No.: US 12,504,028 B2
(45) Date of Patent: Dec. 23, 2025

(54) CARTRIDGE SEALING AND ALIGNMENT IN A PRESSURE EXCHANGER

(71) Applicant: Energy Recovery, Inc., San Leandro, CA (US)

(72) Inventors: Sujan Reddy Gudigopuram, San Ramon, CA (US); Omprakash Samudrala, San Ramon, CA (US); Edvin Besic, Castro Valley, CA (US); Matthew Joseph Pattom, Fremont, CA (US); Alexander Patrick Theodossiou, Alameda, CA (US)

(73) Assignee: Energy Recovery, Inc., San Leandro, CA (US)

( * ) Notice: Subject to any disclaimer, the term of this patent is extended or adjusted under 35 U.S.C. 154(b) by 89 days.

(21) Appl. No.: 18/125,332

(22) Filed: Mar. 23, 2023

(65) Prior Publication Data
US 2023/0304512 A1 Sep. 28, 2023

Related U.S. Application Data

(60) Provisional application No. 63/341,159, filed on May 12, 2022, provisional application No. 63/323,462, filed on Mar. 24, 2022.

(51) Int. Cl.
*F04F 13/00* (2009.01)
(52) U.S. Cl.
CPC .......... *F04F 13/00* (2013.01); *F05D 2240/55* (2013.01)

(58) Field of Classification Search
CPC . F04F 13/00; F16L 17/04; F16L 21/00; F16L 21/06; F16L 23/04; F16L 23/08; F16L 27/1012; F04B 39/121; F05D 2240/55
See application file for complete search history.

(56) References Cited

U.S. PATENT DOCUMENTS

| | | | |
|---|---|---|---|
| 2,526,618 A | 10/1950 | Georges | |
| 2,800,120 A | 7/1957 | Tihamer et al. | |
| 2,946,184 A | 7/1960 | Boszormenyi et al. | |
| 3,234,736 A | 2/1966 | Brian | |
| 5,149,143 A * | 9/1992 | Howell | E21B 33/03 |
| | | | 285/364 |

(Continued)

FOREIGN PATENT DOCUMENTS

| | | | | |
|---|---|---|---|---|
| DE | 844231 C | | 7/1952 | |
| EP | 2664801 A1 * | 11/2013 | | B01D 61/06 |

(Continued)

OTHER PUBLICATIONS

International Search Report and Written Opinion for International Application No. PCT/US2023/016291, mailed Sep. 21, 2023, 21 Pages.

(Continued)

*Primary Examiner* — Kenneth J Hansen
(74) *Attorney, Agent, or Firm* — Lowenstein Sandler LLP

(57) ABSTRACT

A pressure exchanger includes a rotor configured to exchange pressure between a first fluid and a second fluid. The pressure exchanger further includes a sleeve disposed around the rotor and a first end cover disposed at a first distal end of the rotor. The pressure exchanger further includes one or more first sealing components configured to prevent leakage between the sleeve and the first end cover.

14 Claims, 12 Drawing Sheets

(56) References Cited

U.S. PATENT DOCUMENTS

| | | | |
|---|---|---|---|
| 2006/0267343 A1* | 11/2006 | Wright | F16L 17/04 |
| | | | 285/373 |
| 2009/0104046 A1 | 4/2009 | Martin et al. | |
| 2010/0196152 A1 | 8/2010 | Pique et al. | |
| 2013/0280038 A1 | 10/2013 | Martin et al. | |
| 2015/0050177 A1 | 2/2015 | Sigurdsson | |
| 2015/0292310 A1 | 10/2015 | Ghasripoor et al. | |
| 2016/0160881 A1* | 6/2016 | Anderson | F04F 13/00 |
| | | | 415/90 |
| 2016/0160888 A1 | 6/2016 | Morphew | |
| 2019/0277110 A1 | 9/2019 | Shampine | |
| 2020/0141444 A1 | 5/2020 | Thatte et al. | |
| 2021/0123551 A1 | 4/2021 | Kuhn De Chizelle et al. | |
| 2021/0246910 A1 | 8/2021 | Hauge | |

FOREIGN PATENT DOCUMENTS

| | | | |
|---|---|---|---|
| EP | 3090187 | A2 | 11/2016 |
| EP | 3635260 | A1 | 4/2020 |
| GB | 775271 | A | 5/1957 |
| GB | 840408 | A | 7/1960 |
| GB | 1384959 | A | 2/1975 |
| WO | 2008042693 | A1 | 4/2008 |
| WO | 2009046429 | A2 | 4/2009 |
| WO | 2011079045 | A2 | 6/2011 |

OTHER PUBLICATIONS

International Search Report and Written Opinion for International Application No. PCT/US2023/016293, mailed Jun. 13, 2023, 18 Pages.

International Search Report and Written Opinion for International Application No. PCT/US2023/016296, mailed Jun. 13, 2023, 16 Pages.

International Search Report and Written Opinion for International Application No. PCT/US2023/16310, mailed Aug. 21, 2023, 25 Pages.

* cited by examiner

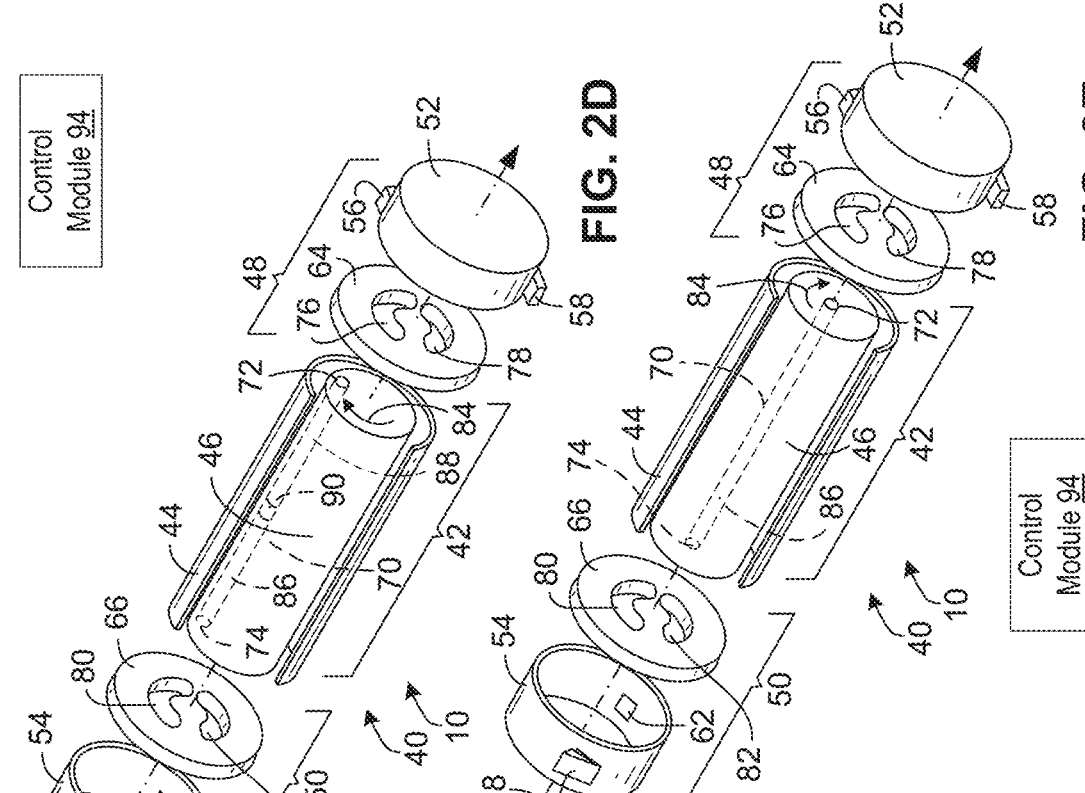
FIG. 2B
FIG. 2C
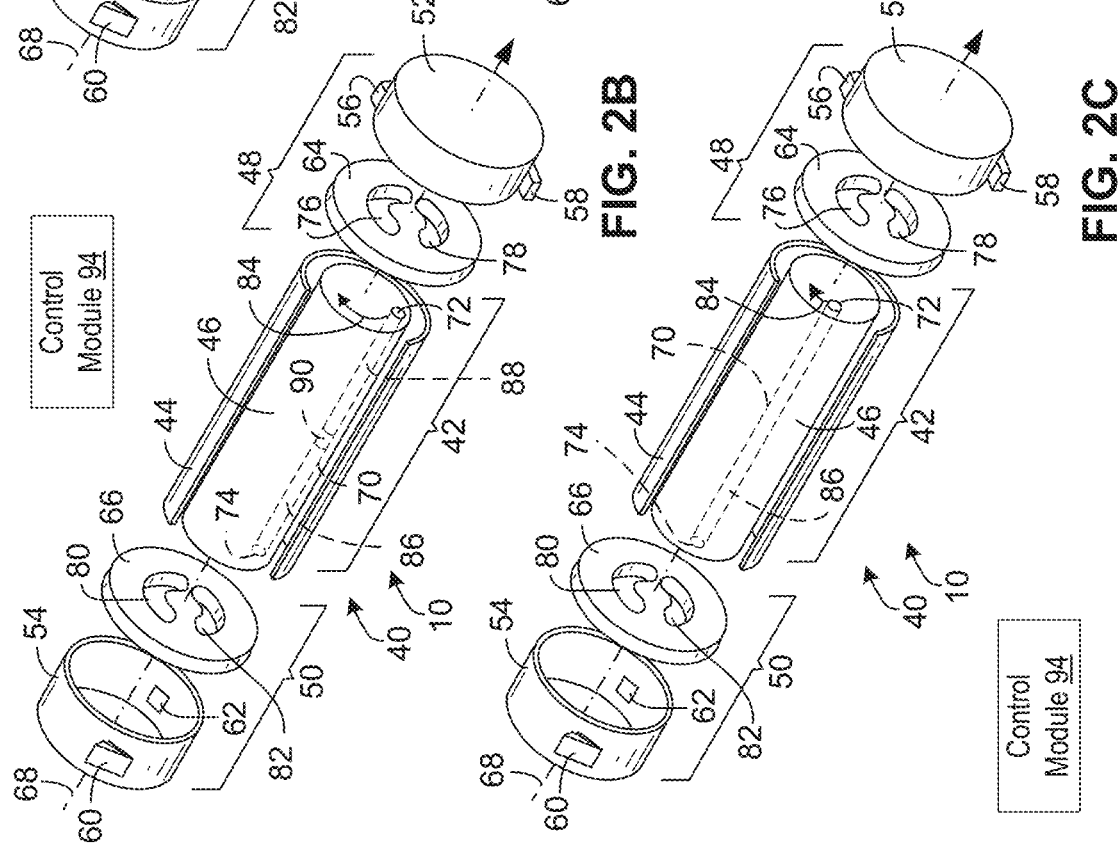
FIG. 2D
FIG. 2E

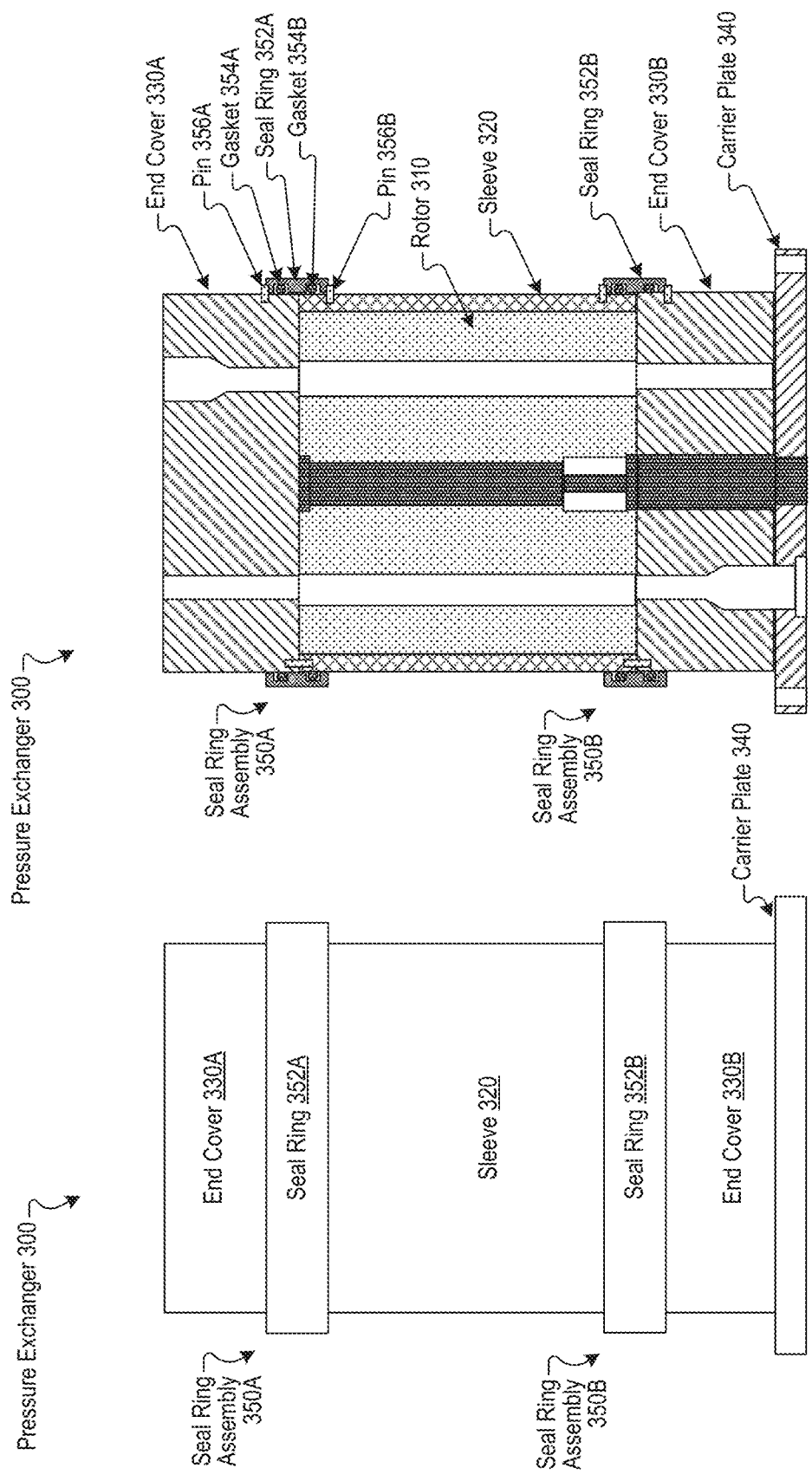

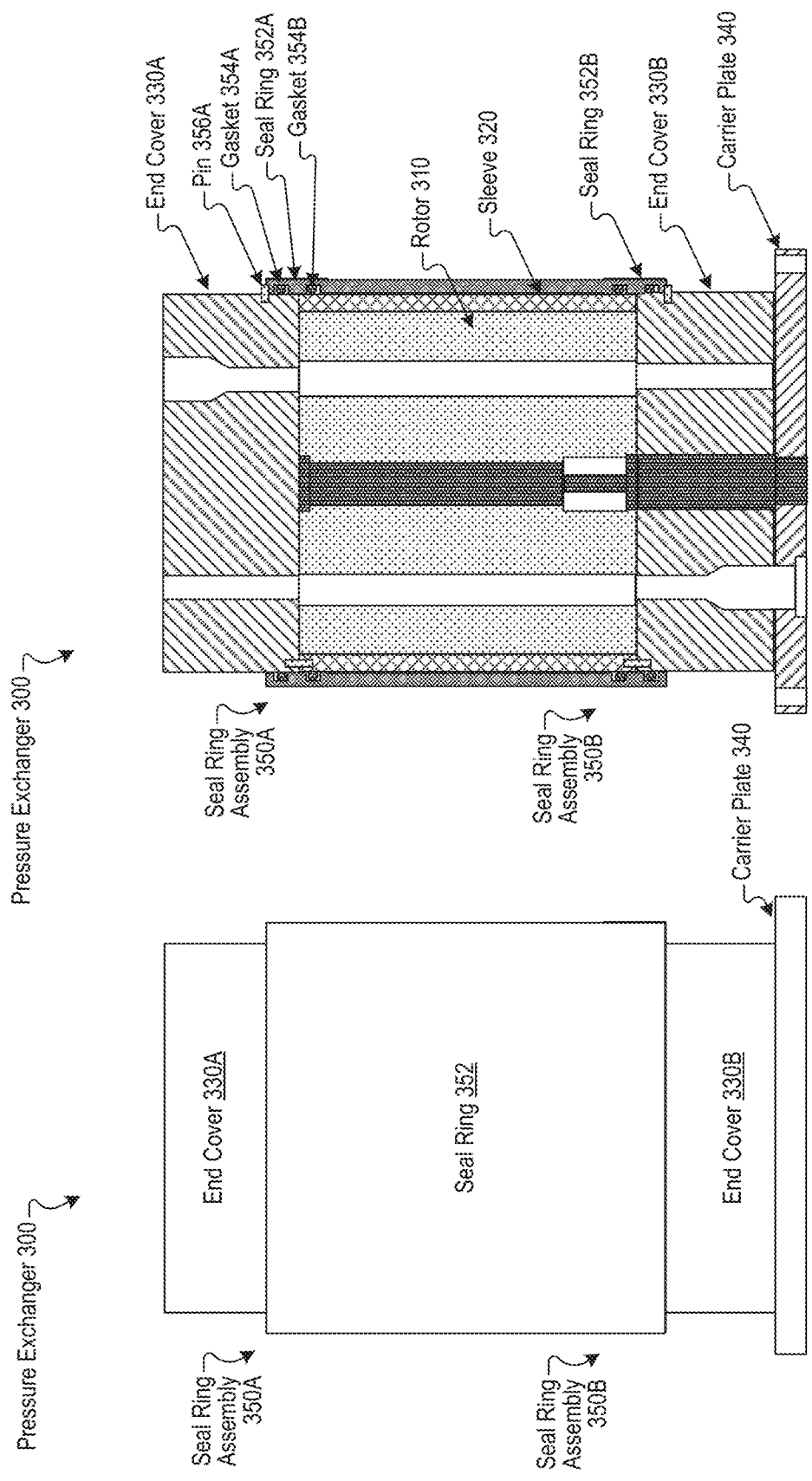

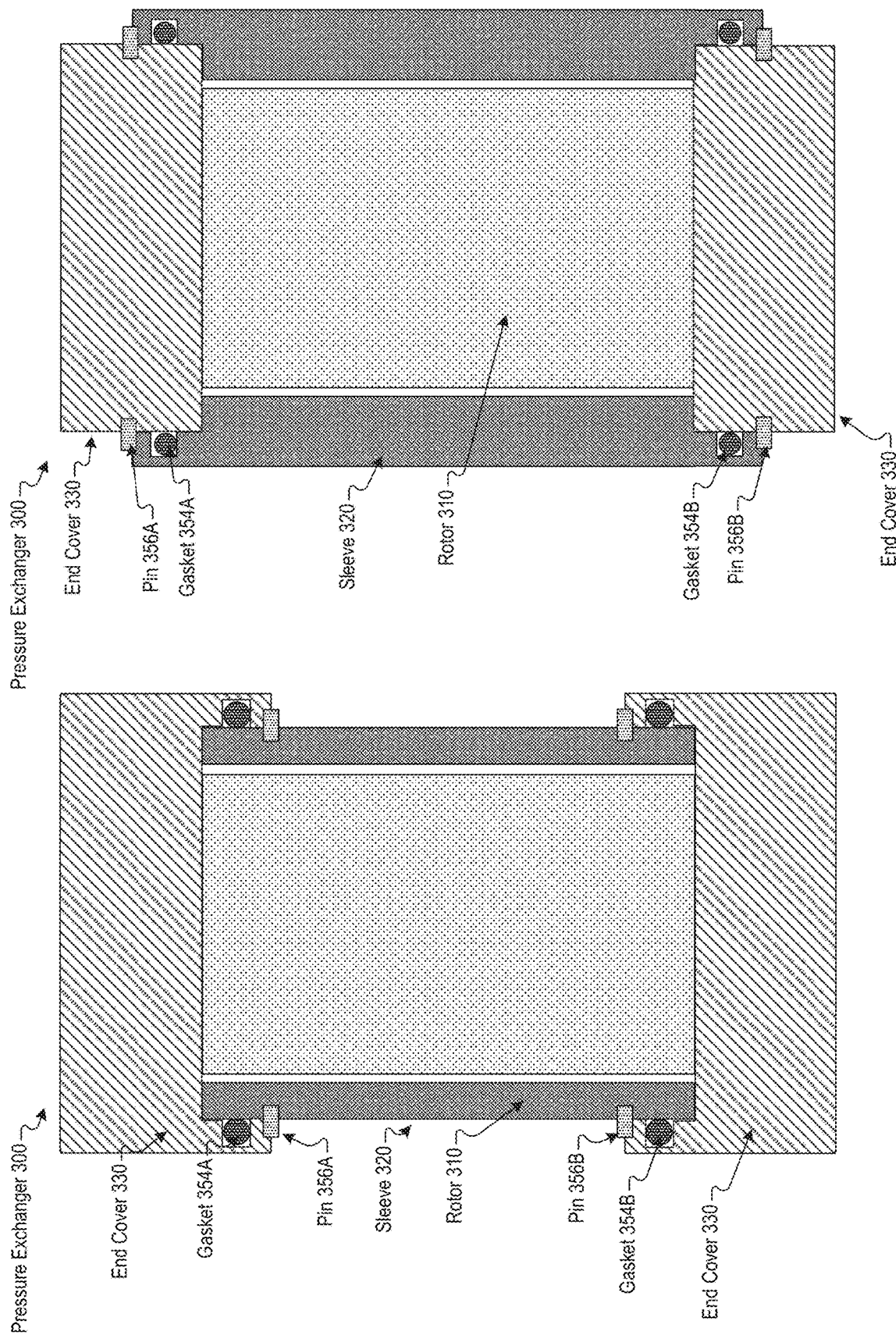

CARTRIDGE SEALING AND ALIGNMENT IN A PRESSURE EXCHANGER

RELATED APPLICATIONS

This application claims benefit of U.S. Provisional Application No. 63/341,159, filed May 12, 2022, and U.S. Provisional Application No. 63/323,462, filed Mar. 24, 2022, the contents of which are incorporated by reference in their entirety.

TECHNICAL FIELD

The present disclosure relates to pressure exchangers, and, more particularly, cartridge sealing and alignment in a pressure exchanger.

BACKGROUND

Systems use fluids at different pressures. Systems use components to increase pressure of fluid.

BRIEF DESCRIPTION OF THE DRAWINGS

The present disclosure is illustrated by way of example, and not by way of limitation in the figures of the accompanying drawings.

FIGS. 2A-E are exploded perspective views of pressure exchangers (PXs), according to certain embodiments.

FIGS. 3A-M illustrate PXs, according to certain embodiments.

DETAILED DESCRIPTION OF EMBODIMENTS

Figure 1A:
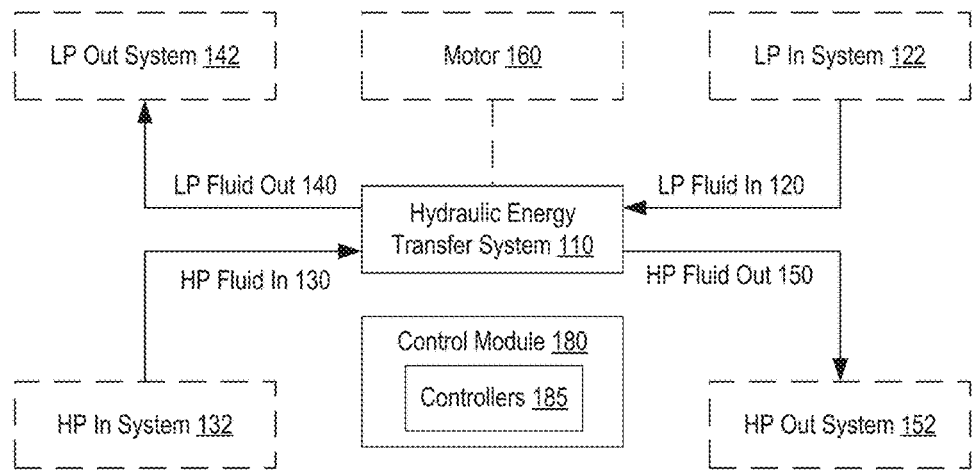
FIGS. 1A-D illustrate schematic diagrams of fluid handling systems including hydraulic energy transfer systems, according to certain embodiments.

Embodiments described herein are related to cartridge sealing and alignment in a PX.

Systems may use fluids at different pressures. A supply of a fluid to a system may be at lower pressure and one or more portions of the system may operate at higher pressures. A system may include a closed loop with various fluid pressures maintained in different portions of the loop. These systems may include hydraulic fracturing (e.g., fracking or fracing) systems, desalinization systems, refrigeration systems, heat pump systems, energy generation systems, mud pumping systems, slurry pumping systems, industrial fluid systems, waste fluid systems, fluid transportation systems, etc. Pumps or compressors may be used to increase pressure of fluids of such systems.

Conventionally, systems (e.g., refrigeration systems, heat pump systems, reversible heat pump systems, water systems, or the like) use pumps or compressors to increase the pressure of a fluid (e.g., a refrigeration fluid such as carbon dioxide ($CO_2$), R-744, R-134a, hydrocarbons, hydrofluorocarbons (HFCs), hydrochlorofluorocarbons (HCFCs), ammonia ($NH_3$), refrigerant blends, R-407A, R-404A, etc.). Conventionally, separate pumps or compressors mechanically coupled to motors are used to increase pressure of the fluid in any portion of a system including an increase in fluid pressure. Pumps and compressors, especially those that operate over a large pressure differential (e.g., cause a large pressure increase in the fluid), require large quantities of energy. Conventional systems thus expend large amounts of energy increasing the pressure of the fluid (via the pumps or compressors driven by the motors). Additionally, conventional fluid transfer systems decrease the pressure of the fluid through expansion valves. Conventional systems inefficiently increase pressure of fluid and decrease pressure of the fluid when operating in a loop. This is wasteful in terms of energy used to run the conventional systems (e.g., energy used to repeatedly increase the pressure of the refrigeration fluid to cause increase or decrease of temperature of the surrounding environment).

Conventionally, systems (e.g., refrigeration systems, heat pump systems, reversible heat pump systems, water systems, or the like) have components that may be misaligned and/or may not be sealed. Misalignment may cause the systems to operate inefficiently. Not being sealed may cause escape of fluids of the system to the environment and/or insertion of environmental fluids into the system. This may be hazardous to health of people around the system, may result in waste of system fluids, may cause the system to operate inefficiently, and/or may cause foreign particles to enter the system and damage system components.

The systems, devices, and methods of the present disclosure provide solutions to these and other shortcomings of conventional systems. The present disclosure provides PXs for use in systems (e.g., fluid handling systems, heat transfer systems, refrigeration systems, heat pump systems, cooling systems, heating systems, etc.). In a system, a PX may be configured to exchange pressure between a first fluid (e.g., a high pressure portion of a refrigeration fluid in a refrigeration cycle) and a second fluid (e.g., a low pressure portion of the refrigeration fluid in the refrigeration cycle). The PX may receive the first fluid (e.g., a portion of the refrigeration fluid at high pressure) via a first inlet (e.g., a high pressure inlet) and a second fluid (e.g., a portion of the refrigeration fluid at a low pressure) via a second inlet (e.g., a low pressure inlet). When entering the PX, the first fluid may be of a higher pressure than the second fluid. The PX may exchange pressure between the first fluid and the second fluid. The first fluid may exit the PX via a first outlet (e.g., a low pressure outlet) and the second fluid may exit the PX via a second outlet (e.g., a high pressure outlet). When exiting the PX, the second fluid may have a higher pressure than the first fluid (e.g., pressure has been exchanged between the first fluid and the second fluid).

In some embodiments, a PX includes a sleeve disposed around the rotor, a first end cover disposed at a first distal end of the rotor, and a second end cover disposed at a second distal end of the rotor. The PX further includes one or more first sealing components configured to prevent leakage between the sleeve and the first end cover and one or more second sealing components configured to prevent leakage between the sleeve and the second end cover.

In some embodiments, the PX includes alignment components configured to align the first end cover with the second end cover. The alignment components may include first alignment components inserted radially into the first end cover and second alignment components inserted radially into the second end cover.

In some embodiments, the PX includes a pressure exchanger seal ring assembly that is to be disposed around an interface between an end cover of a pressure exchanger and a sleeve of the pressure exchanger to prevent leakage between the sleeve and the end cover. The pressure exchanger seal ring assembly may include a seal ring, a first gasket, a second gasket, a first pin, and/or a second pin. The seal ring may include an inner surface forming a first groove and a second groove. The first gasket is configured to be disposed in the first groove and the second gasket is configured to be disposed in the second groove. The first gasket is to interface with an end cover outer surface of the end cover and the second gasket is to interface with a sleeve outer surface of the sleeve.

The first pin includes a first distal end configured to be disposed in an upper seal ring recess formed by an upper surface of the seal ring and a second distal end configured to be inserted radially into an end cover recess formed by the end cover outer surface of the end cover. The second pin includes a first distal end configured to be disposed in a lower seal ring recess formed by a lower surface of the seal ring and a second distal end configured to be inserted radially into a sleeve recess formed by the sleeve outer surface of the sleeve.

Systems, devices, and methods of the present disclosure provide advantages over conventional solutions. Systems of the present disclosure reduce energy consumption compared to conventional systems. For example, use of a PX of the present disclosure may recover energy stored as pressure and transfer that energy back into the system, reducing the energy cost of operating the system. Systems of the present disclosure may reduce wear on components (e.g., pumps, compressors) compared to conventional systems. A PX of the present disclosure may be more aligned and may be better sealed than conventional system components. This provides a healthier environment, reduces waste of system fluids, increases efficiency of systems, reduces foreign particles in the system compared to conventional systems.

Although some embodiments of the present disclosure are described in relation to pressure exchangers, energy recovery devices, and hydraulic energy transfer systems, the current disclosure can be applied to other systems and devices (e.g., pressure exchanger that is not isobaric, rotating components that are not a pressure exchanger, a pressure exchanger that is not rotary, systems that do not include pressure exchangers, etc.).

Although some embodiments of the present disclosure are described in relation to exchanging pressure between fluid used in fracing systems, desalinization systems, heat pump systems, and/or refrigeration systems, the present disclosure can be applied to other types of systems. Fluids can refer to liquid, gas, transcritical fluid, supercritical fluid, subcritical fluid, and/or combinations thereof.

FIGS. 1A-D illustrate schematic diagrams of fluid handling systems 100 including hydraulic energy transfer systems 110, according to certain embodiments.

In some embodiments, a hydraulic energy transfer system 110 includes a pressure exchanger (e.g., PX). The PX may include one or more of the features described in one or more of FIGS. 3A-M (e.g., seal ring, gasket, pins, etc.) to provide alignment and/or to prevent leakage of fluids.

The hydraulic energy transfer system 110 (e.g., PX) receives low pressure (LP) fluid in 120 (e.g., low-pressure inlet stream) from a LP in system 122. The hydraulic energy transfer system 110 also receives high pressure (HP) fluid in 130 (e.g., high-pressure inlet stream) from HP in system 132. The hydraulic energy transfer system 110 (e.g., PX) exchanges pressure between the HP fluid in 130 and the LP fluid in 120 to provide LP fluid out 140 (e.g., low-pressure outlet stream) to LP fluid out system 142 and to provide HP fluid out 150 (e.g., high-pressure outlet stream) to HP fluid out system 152.

In some embodiments, the hydraulic energy transfer system 110 includes a PX to exchange pressure between the HP fluid in 130 and the LP fluid in 120. The PX may be a device that transfers fluid pressure between HP fluid in 130 and LP fluid in 120 at efficiencies in excess of approximately 50%, 60%, 70%, 80%, 90%, or greater (e.g., without utilizing centrifugal technology). High pressure (e.g., HP fluid in 130, HP fluid out 150) refers to pressures greater than the low pressure (e.g., LP fluid in 120, LP fluid out 140). LP fluid in 120 of the PX may be pressurized and exit the PX at high pressure (e.g., HP fluid out 150, at a pressure greater than that of LP fluid in 120), and HP fluid in 130 may be depressurized and exit the PX at low pressure (e.g., LP fluid out 140, at a pressure less than that of the HP fluid in 130). The PX may operate with the HP fluid in 130 directly applying a force to pressurize the LP fluid in 120, with or without a fluid separator between the fluids. Examples of fluid separators that may be used with the PX include, but are not limited to, pistons, bladders, diaphragms, and the like. In some embodiments, PXs may be rotary devices. Rotary PXs, such as those manufactured by Energy Recovery, Inc. of San Leandro, Calif., may not have any separate valves, since the effective valving action is accomplished internal to the device via the relative motion of a rotor with respect to end covers. Rotary PXs may be designed to operate with internal pistons to isolate fluids and transfer pressure with relatively little mixing of the inlet fluid streams. Reciprocating PXs may include a piston moving back and forth in a cylinder for transferring pressure between the fluid streams. Any PX or multiple PXs may be used in the present disclosure, such as, but not limited to, rotary PXs, reciprocating PXs, or any combination thereof. In addition, the PX may be disposed on a skid separate from the other components of a fluid handling system 100 (e.g., in situations in which the PX is added to an existing fluid handling system).

In some embodiments, a motor 160 is coupled to hydraulic energy transfer system 110 (e.g., to a PX). In some embodiments, the motor 160 controls the speed of a rotor of the hydraulic energy transfer system 110 (e.g., to increase pressure of HP fluid out 150, to decrease pressure of LP fluid out 140, etc.). In some embodiments, motor 160 generates energy (e.g., acts as a generator) based on pressure exchanging in hydraulic energy transfer system 110.

The hydraulic energy transfer system 110 may be a hydraulic protection system (e.g., hydraulic buffer system, hydraulic isolation system) that may block or limit contact between solid particle laden fluid (e.g., frac fluid) and various equipment (e.g., hydraulic fracturing equipment, high-pressure pumps) while exchanging work and/or pressure with another fluid. By blocking or limiting contact between various equipment (e.g., fracturing equipment) and solid particle containing fluid, the hydraulic energy transfer system 110 increases the life and performance, while reducing abrasion and wear, of various equipment (e.g., fracturing equipment, high pressure fluid pumps). Less expensive equipment may be used in the fluid handling system 100 by using equipment (e.g., high pressure fluid pumps) not designed for abrasive fluids (e.g., frac fluids and/or corrosive fluids).

The hydraulic energy transfer system 110 may include a hydraulic turbocharger or hydraulic pressure exchange system, such as a rotating PX. The PX may include one or more chambers (e.g., 1 to 100) to facilitate pressure transfer and equalization of pressures between volumes of first and second fluids (e.g., gas, liquid, multi-phase fluid). In some embodiments, the PX may transfer pressure between a first fluid (e.g., pressure exchange fluid, such as a proppant free or substantially proppant free fluid) and a second fluid that may be highly viscous and/or contain solid particles (e.g., frac fluid containing sand, proppant, powders, debris, ceramics). The solid particle fluid causes abrasion and/or erosion of components of the PX, such as the rotor and end covers of the PX. The fluid (e.g., abrasive particles in the fluid) may cause wear to an interface between the rotor and each end cover as the rotor rotates relative to the end covers. Replacing worn components of the PX may be costly.

The hydraulic energy transfer system 110 may be used in different types of systems, such as fracing systems, desalination systems, refrigeration systems, etc.

FIG. 1A illustrates a schematic diagram of a fluid handling system 100A including a hydraulic energy transfer system 110, according to certain embodiments. Fluid handling system 100A may include a control module 180 that includes one or more controllers 185.

Figure 1B:
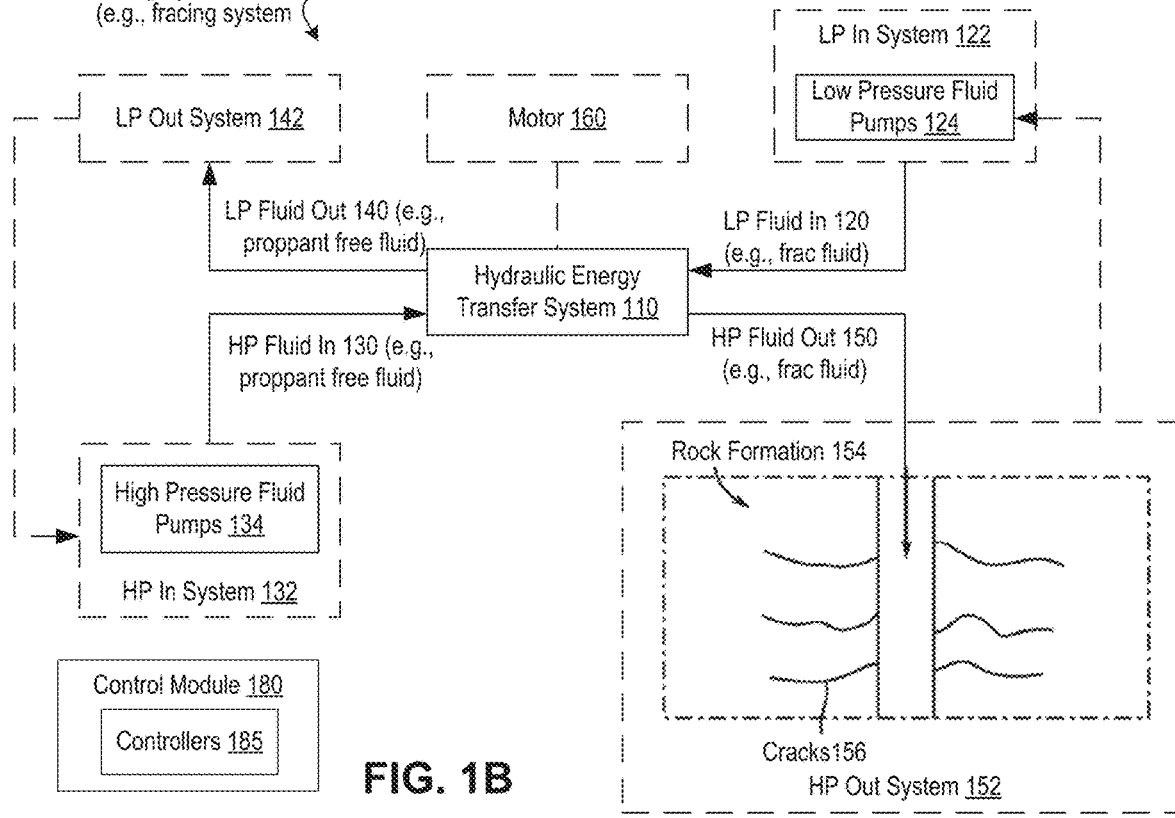

FIG. 1B illustrates a schematic diagram of a fluid handling system 100B including a hydraulic energy transfer system 110, according to certain embodiments. Fluid handling system 100B may be a fracing system. In some embodiments, fluid handling system 100B includes more components, less components, same routing, different routing, and/or the like than that shown in FIG. 1B.

LP fluid in 120 and HP fluid out 150 may be frac fluid (e.g., fluid including solid particles, proppant fluid, etc.). HP fluid in 130 and LP fluid out 140 may be substantially solid particle free fluid (e.g., proppant free fluid, water, filtered fluid, etc.).

LP in system 122 may include one or more low pressure fluid pumps to provide LP fluid in 120 to the hydraulic energy transfer system 110 (e.g., PX). HP in system 132 may include one or more high pressure fluid pumps 134 to provide HP fluid in 130 to hydraulic energy transfer system 110.

Hydraulic energy transfer system 110 exchanges pressure between LP fluid in 120 (e.g., low pressure frac fluid) and HP fluid in 130 (e.g., high pressure water) to provide HP fluid out 150 (e.g., high pressure frac fluid) to HP out system 152 and to provide LP fluid out 140 (e.g., low pressure water). HP out system 152 may include a rock formation 154 (e.g., well) that includes cracks 156. The solid particles (e.g., proppants) from HP fluid out 150 may be provided into the cracks 156 of the rock formation.

In some embodiments, LP fluid out 140, high pressure fluid pumps 134, and HP fluid in 130 are part of a first loop (e.g., proppant free fluid loop). The LP fluid out 140 may be provided to the high pressure fluid pumps to generate HP fluid in 130 that becomes LP fluid out 140 upon exiting the hydraulic energy transfer system 110.

In some embodiments, LP fluid in 120, HP fluid out 150, and low pressure fluid pumps 124 are part of a second loop (e.g., proppant containing fluid loop). The HP fluid out 150 may be provided into the rock formation 154 and then pumped from the rock formation 154 by the low pressure fluid pumps 124 to generate LP fluid in 120.

In some embodiments, fluid handling system 100B is used in well completion operations in the oil and gas industry to perform hydraulic fracturing (e.g., fracking, fracing) to increase the release of oil and gas in rock formations 154. HP out system 152 may include rock formations 154 (e.g., a well). Hydraulic fracturing may include pumping HP fluid out 150 containing a combination of water, chemicals, and solid particles (e.g., sand, ceramics, proppant) into a well (e.g., rock formation 154) at high pressures. LP fluid in 120 and HP fluid out 150 may include a particulate laden fluid that increases the release of oil and gas in rock formations 154 by propagating and increasing the size of cracks 156 in the rock formations 154. The high pressures of HP fluid out 150 initiates and increases size of cracks 156 and propagation through the rock formation 154 to release more oil and gas, while the solid particles (e.g., powders, debris, etc.) enter the cracks 156 to keep the cracks 156 open (e.g., prevent the cracks 156 from closing once HP fluid out 150 is depressurized).

In order to pump this particulate laden fluid into the rock formation 154 (e.g., a well), the fluid handling system 100B may include one or more high pressure fluid pumps 134 and one or more low pressure fluid pumps 124 coupled to the hydraulic energy transfer system 110. For example, the hydraulic energy transfer system 110 may be a hydraulic turbocharger or a PX (e.g., a rotary PX). In operation, the hydraulic energy transfer system 110 transfers pressures without any substantial mixing between a first fluid (e.g., HP fluid in 130, proppant free fluid) pumped by the high pressure fluid pumps 134 and a second fluid (e.g., LP fluid in 120, proppant containing fluid, frac fluid) pumped by the low pressure fluid pumps 124. In this manner, the hydraulic energy transfer system HO blocks or limits wear on the high pressure fluid pumps 134, while enabling the fluid handling system. 100B to pump a high-pressure frac, fluid (e.g., HP fluid out 150) into the rock formation 154 to release oil and gas. In order to operate in corrosive and abrasive environments, the hydraulic energy transfer system 110 may be made from materials resistant to corrosive and abrasive substances in either the first and second fluids. For example, the hydraulic energy transfer system 110 may be made out of ceramics (e.g., alumina, cermets, such as carbide, oxide, nitride, or boride hard phases) within a metal matrix (e.g., Co, Cr or Ni or any combination thereof) such as tungsten carbide in a matrix of CoCr, Ni, NiCr or Co.

In some embodiments, the hydraulic energy transfer system 110 includes a PX (e.g., rotary PX) and HP fluid in 130 (e.g., the first fluid, high-pressure solid particle free fluid) enters a first side of the PX where the HP fluid in 130 contacts LP fluid in 120 (e.g., the second fluid, low-pressure frac fluid) entering the PX on a second side. The contact between the fluids enables the HP fluid in 130 to increase the pressure of the second fluid (e.g., LP fluid in 120), which drives the second fluid out (e.g., HP fluid out 150) of the PX and down a well (e.g., rock formation 154) for fracturing operations. The first fluid (e.g., LP fluid out 140) similarly exits the PX, but at a low pressure after exchanging pressure with the second fluid. As noted above, the second fluid may be a low-pressure frac fluid that may include abrasive particles, which may wear the interface between the rotor and the respective end covers as the rotor rotates relative to the respective end covers.

Figure 1C:
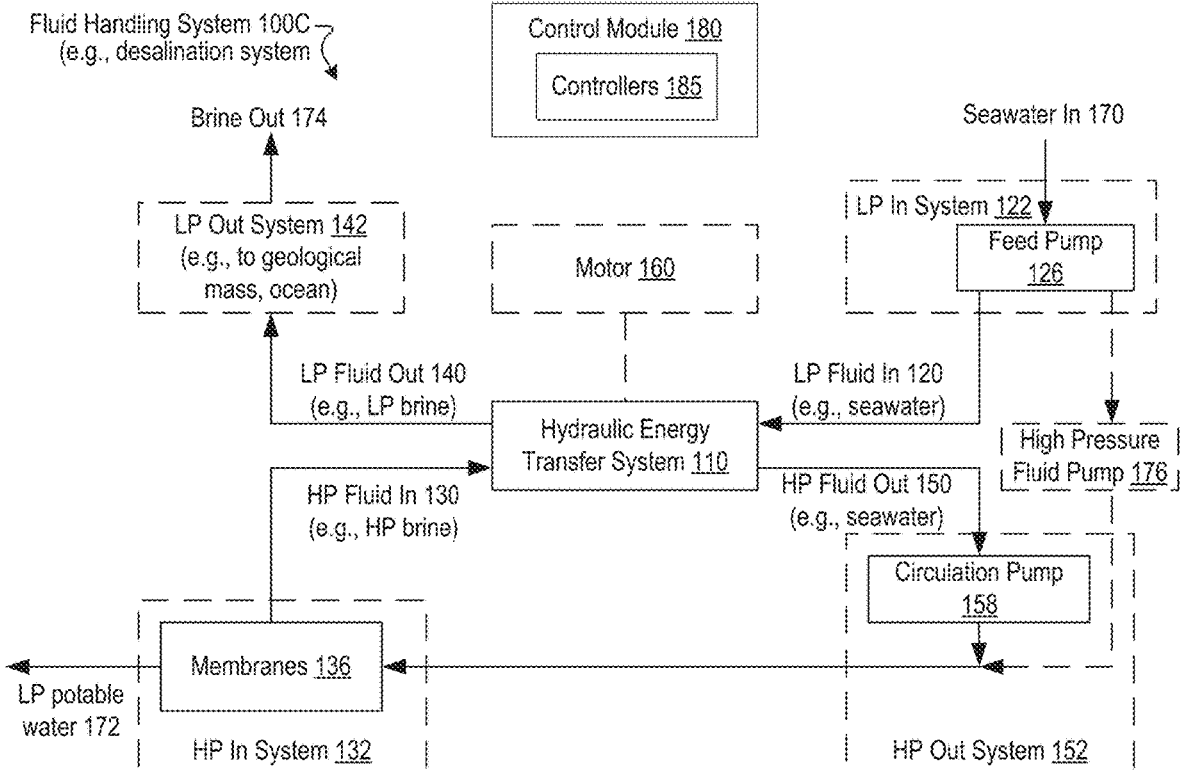

FIG. 1C illustrates a schematic diagram of a fluid handling system 100C including a hydraulic energy transfer system 110, according to certain embodiments. Fluid handling system 100C may be a desalination system (e.g., remove salt and/or other minerals from water). In some embodiments, fluid handling system 100C includes more components, less components, same routing, different routing, and/or the like than that shown in FIG. 1C.

LP in system 122 may include a feed pump 126 (e.g., low pressure fluid pump 124) that receives seawater in 170 (e.g., feed water from a reservoir or directly from the ocean) and provides LP fluid in 120 (e.g., low pressure seawater, feed water) to hydraulic energy transfer system 110 (e.g., PX). HP in system 132 may include membranes 136 that provide HP fluid in 130 (e.g., high pressure brine) to hydraulic energy transfer system 110 (e.g., PX). The hydraulic energy transfer system 110 exchanges pressure between the HP fluid in 130 and LP fluid in 120 to provide HP fluid out 150 (e.g., high pressure seawater) to HP out system 152 and to provide LP fluid out 140 (e.g., low pressure brine) to LP out system 142 (e.g., geological mass, ocean, sea, discarded, etc.).

The membranes 136 may be a membrane separation device configured to separate fluids traversing a membrane, such as a reverse osmosis membrane. Membranes 136 may provide HP fluid in 130 which is a concentrated feed-water or concentrate (e.g., brine) to the hydraulic energy transfer system 110. Pressure of the HP fluid in 130 may be used to compress low-pressure feed water (e.g., LP fluid in 120) to be high pressure feed water (e.g., HP fluid out 150). For simplicity and illustration purposes, the term feed water is used. However, fluids other than water may be used in the hydraulic energy transfer system 110.

The circulation pump 158 (e.g., centrifugal pump) provides the HP fluid out 150 (e.g., high pressure seawater) to membranes 136. The membranes 136 filter the HP fluid out 150 to provide LP potable water 172 and HP fluid in 130 (e.g., high pressure brine). The LP out system 142 provides brine out 174 (e.g., to geological mass, ocean, sea, discarded, etc.).

In some embodiments, a high pressure fluid pump 176 is disposed between the feed pump 126 and the membranes 136. The high pressure fluid pump 176 increases pressure of the low pressure seawater (e.g., LP fluid in 120, provides high pressure feed water) to be mixed with the high pressure seawater provided by circulation pump 158.

In some embodiments, use of the hydraulic energy transfer system 110 decreases the load on high pressure fluid pump 176. In some embodiments, fluid handling system 100C provides LP potable water 172 without use of high pressure fluid pump 176. In some embodiments, fluid handling system 100C provides LP potable water 172 with intermittent use of high pressure fluid pump 176.

In some examples, hydraulic energy transfer system 110 (e.g., PX) receives LP fluid in 120 (e.g., low-pressure feed-water) at about 30 pounds per square inch (PSI) and receives HP fluid in 130 (e.g., high-pressure brine or concentrate) at about 980 PSI. The hydraulic energy transfer system 110 (e.g., PX) transfers pressure from the high-pressure concentrate (e.g., HP fluid in 130) to the low-pressure feed-water (e.g., LP fluid in 120). The hydraulic energy transfer system 110 (e.g., PX) outputs HP fluid out 150 (e.g., high pressure (compressed) feed-water) at about 965 PSI and LP fluid out 140 (e.g., low-pressure concentrate) at about 15 PSI. Thus, the hydraulic energy transfer system 110 (e.g., PX) may be about 97% efficient since the input volume is about equal to the output volume of the hydraulic energy transfer system 110 (e.g., PX), and 965 PSI is about 97% of 980 PSI.

Figure 1D:
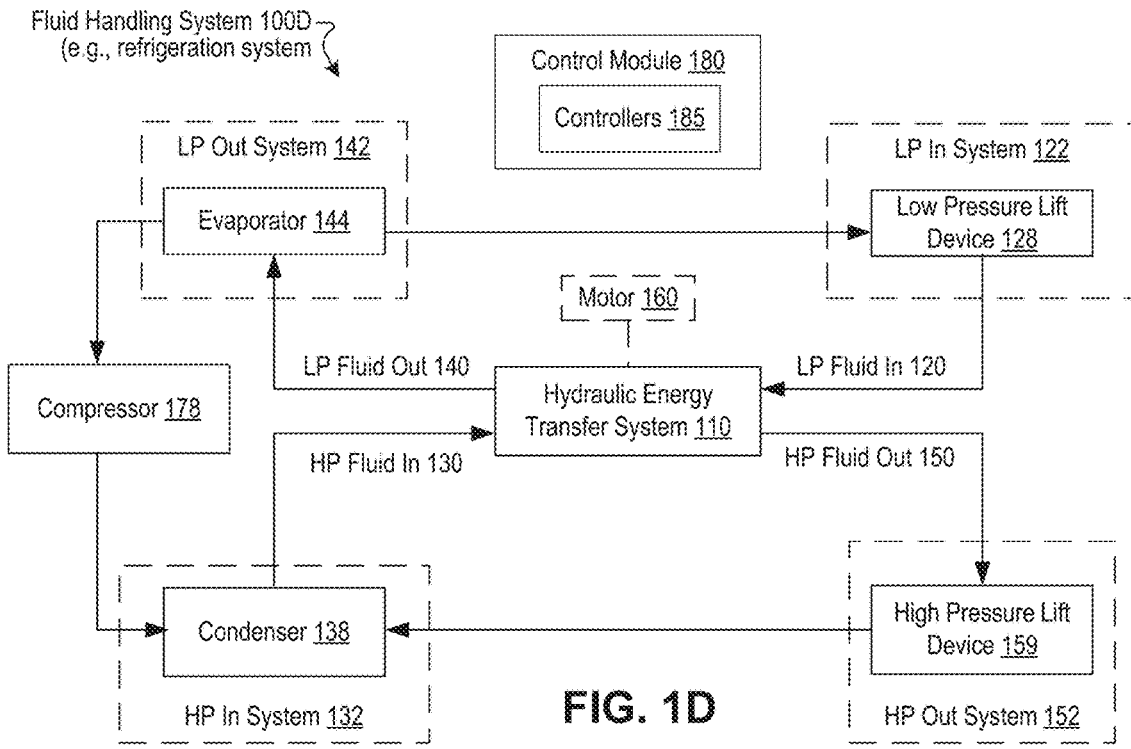
Figure 2A:
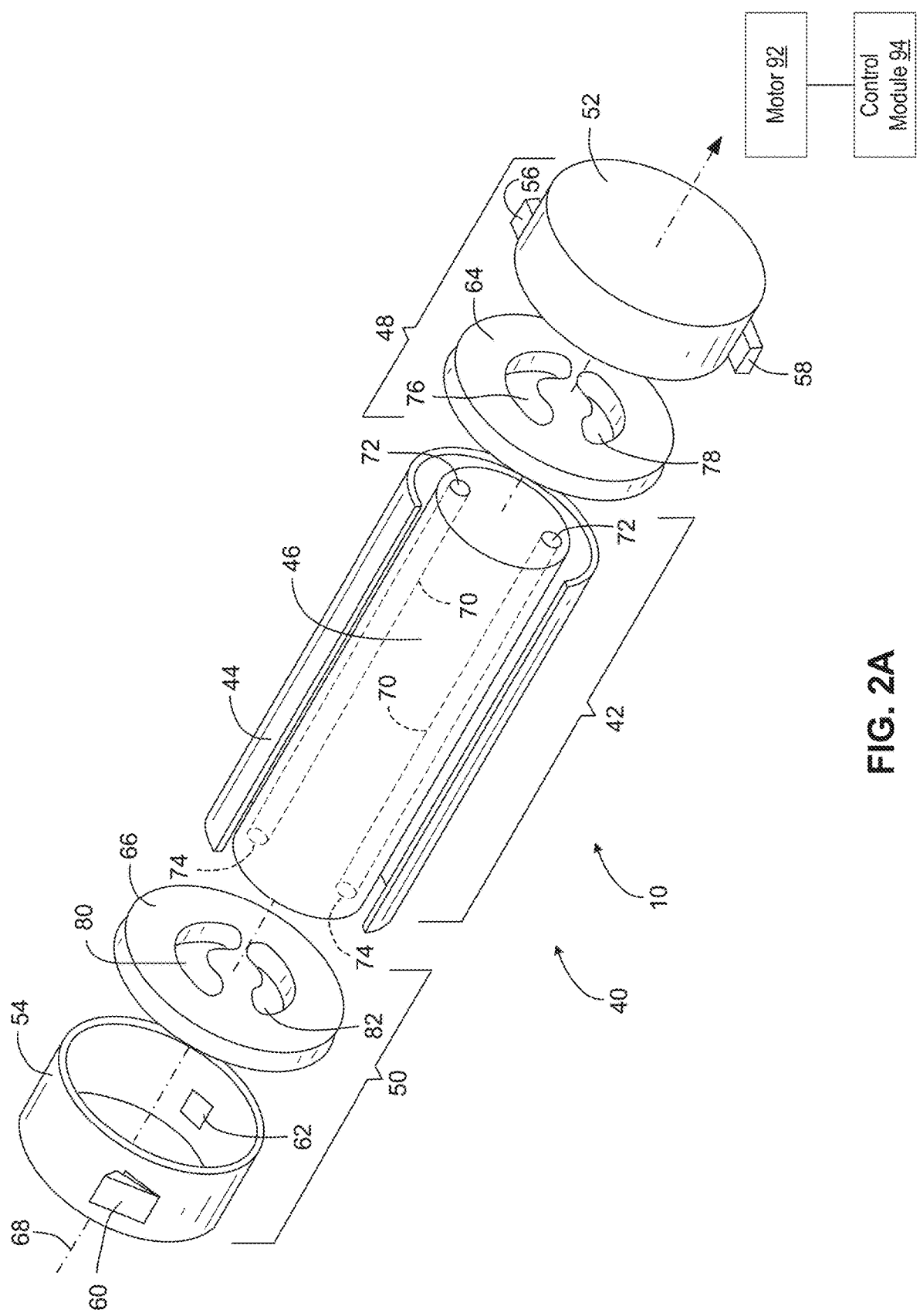

FIG. 1D illustrates a schematic diagram of a fluid handling system 100D including a hydraulic energy transfer system 110, according to certain embodiments. Fluid handling system 100D may be a refrigeration system. In some embodiments, fluid handling system 100D includes more components, less components, same routing, different routing, and/or the like than that shown in FIG. 1D.

Hydraulic energy transfer system 110 (e.g., PX) may receive LP fluid in 120 from LP in system 122 (e.g., low pressure lift device 128, low pressure fluid pump, etc.) and HP fluid in 130 from HP in system 132 (e.g., condenser 138). The hydraulic energy transfer system 110 (e.g., PX) may exchange pressure between the LP fluid in 120 and HP fluid in 130 to provide HP fluid out 150 to HP out system 152 (e.g., high pressure lift device 159) and to provide LP fluid out 140 to LP out system 142 (e.g., evaporator 144). The evaporator 144 may provide the fluid to compressor 178 and low pressure lift device 128. The condenser 138 may receive fluid from compressor 178 and high pressure lift device 159.

The fluid handling system 100D may be a closed system. LP fluid in 120, HP fluid in 130, LP fluid out 140, and HP fluid out 150 may all be a fluid (e.g., refrigerant) that is circulated in the closed system of fluid handling system 100D.

In some embodiments, the fluid of fluid handling system 100D may include solid particles. For example, the piping, equipment, connections (e.g., pipe welds, pipe soldering), etc. may introduce solid particles (e.g., solid particles from the welds) into the fluid in the fluid handling system 100D. The solid particles in the fluid and/or the high pressure of the fluid may cause abrasion and/or erosion of components (e.g., rotor, end covers) of the PX of hydraulic energy transfer system 110.

FIGS. 2A-E are exploded perspective views a rotary PX 40 (e.g., rotary pressure exchanger, rotary liquid piston compressor (LPC)), according to certain embodiments. PX 40 may include a motor 92 and/or a control module 94.

In some embodiments, PX 40 includes one or more of the features described in one or more of FIGS. 3A-M (e.g., seal ring, gasket, pins, etc.) to provide alignment and/or to prevent leakage of fluids.

PX 40 is configured to transfer pressure and/or work between a first fluid (e.g., proppant free fluid or supercritical carbon dioxide, HP fluid in 130) and a second fluid (e.g., frac fluid or superheated gaseous carbon dioxide, LP fluid in 120) with minimal mixing of the fluids. The rotary PX 40 may include a generally cylindrical body portion 42 that includes a sleeve 44 (e.g., rotor sleeve) and a rotor 46. The rotary PX 40 may also include two end caps 48 and 50 that include manifolds 52 and 54, respectively. Manifold 52 includes respective inlet port 56 and outlet port 58, while manifold 54 includes respective inlet port 60 and outlet port 62. In operation, these inlet ports 56, 60 enable the first and second fluids to enter the rotary PX 40 to exchange pressure, while the outlet ports 58, 62 enable the first and second fluids to then exit the rotary PX 40. In operation, the inlet port 56 may receive a high-pressure first fluid (e.g., HP fluid in 130), and after exchanging pressure, the outlet port 58 may be used to route a low-pressure first fluid (e.g., LP fluid out 140) out of the rotary PX 40. Similarly, the inlet port 60 may receive a low-pressure second fluid (e.g., LP fluid in 120) and the outlet port 62 may be used to route a high-pressure second fluid (e.g., HP fluid out 150) out of the rotary PX 40. The end caps 48 and 50 include respective end covers 64 and 66 (e.g., end plates) disposed within respective manifolds 52 and 54 that enable fluid sealing contact with the rotor 46.

As noted above, one or more components of the PX 40, such as the rotor 46, the end cover 64, and/or the end cover 66, may be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). For example, tungsten carbide may be more durable and may provide improved wear resistance to abrasive fluids as compared to other materials, such as alumina ceramics.

The rotor 46 may be cylindrical and disposed in the sleeve 44, which enables the rotor 46 to rotate about the axis 68. The rotor 46 may have a plurality of channels 70 (e.g., ducts, rotor ducts) extending substantially longitudinally through the rotor 46 with openings 72 and 74 (e.g., rotor ports) at each end arranged symmetrically about the longitudinal axis 68. The openings 72 and 74 of the rotor 46 are arranged for hydraulic communication with inlet and outlet apertures 76 and 78 (e.g., end cover inlet port and end cover outlet port) and 80 and 82 (e.g., end cover inlet port and end cover outlet port) in the end covers 64 and 66, in such a manner that during rotation the channels 70 are exposed to fluid at high-pressure and fluid at low-pressure. As illustrated, the inlet and outlet apertures 76 and 78 and 80 and 82 may be designed in the form of arcs or segments of a circle (e.g., C-shaped).

In some embodiments, a controller using sensor feedback (e.g., revolutions per minute measured through a tachometer or optical encoder or volume flow rate measured through flowmeter) may control the extent of mixing between the first and second fluids in the rotary PX 40, which may be used to improve the operability of the fluid handling system (e.g., fluid handling systems 100A-D of FIGS. 1A-D). For example, varying the volume flow rates of the first and second fluids entering the rotary PX 40 allows the plant operator (e.g., system operator) to control the amount of fluid mixing within the PX 40. In addition, varying the rotational speed of the rotor 46 also allows the operator to control mixing. Three characteristics of the rotary PX 40 that affect mixing are: (1) the aspect ratio of the rotor channels 70; (2) the duration of exposure between the first and second fluids; and (3) the creation of a fluid barrier (e.g., an interface) between the first and second fluids within the rotor channels 70. First, the rotor channels 70 (e.g., ducts) are generally long and narrow, which stabilizes the flow within the rotary PX 40. In addition, the first and second fluids may move through the channels 70 in a plug flow regime with minimal axial mixing. Second, in certain embodiments, the speed of the rotor 46 reduces contact between the first and second fluids. For example, the speed of the rotor 46 (e.g., rotor speed of approximately 1200 RPM) may reduce contact times between the first and second fluids to less than approximately 0.15 seconds, 0.10 seconds, or 0.05 seconds. Third, a small portion of the rotor channel 70 is used for the exchange of pressure between the first and second fluids. Therefore, a volume of fluid remains in the channel 70 as a barrier between the first and second fluids. All these mechanisms may limit mixing within the rotary PX 40. Moreover, in some embodiments, the rotary PX 40 may be designed to operate with internal pistons or other barriers, either complete or partial, that isolate the first and second fluids while enabling pressure transfer.

FIGS. 2B-2E are exploded views of an embodiment of the rotary PX 40 illustrating the sequence of positions of a single rotor channel 70 in the rotor 46 as the channel 70 rotates through a complete cycle. It is noted that FIGS. 2B-2E are simplifications of the rotary PX 40 showing one rotor channel 70, and the channel 70 is shown as having a circular cross-sectional shape. In other embodiments, the rotary PX 40 may include a plurality of channels 70 with the same or different cross-sectional shapes (e.g., circular, oval, square, rectangular, polygonal, etc.). Thus, FIGS. 2B-2E are simplifications for purposes of illustration, and other embodiments of the rotary PX 40 may have configurations different from that shown in FIGS. 2A-2E. As described in detail below, the rotary PX 40 facilitates pressure exchange between first and second fluids by enabling the first and second fluids to briefly contact each other within the rotor 46. In certain embodiments, this exchange happens at speeds that result in limited mixing of the first and second fluids. The speed of the pressure wave traveling through the rotor channel 70 (as soon as the channel is exposed to the aperture 76), the diffusion speeds of the fluids, and the rotational speed of rotor 46 dictate whether any mixing occurs and to what extent.

FIG. 2B is an exploded perspective view of an embodiment of a rotary PX 40 (e.g., rotary LPC), according to certain embodiments. In FIG. 2B, the channel opening 72 is in a first position. In the first position, the channel opening 72 is in fluid communication with the aperture 78 in end cover 64 and therefore with the manifold 52, while the opposing channel opening 74 is in hydraulic communication with the aperture 82 in end cover 66 and by extension with the manifold 54. As will be discussed below, the rotor 46 may rotate in the clockwise direction indicated by arrow 84. In operation, low-pressure second fluid 86 passes through end cover 66 and enters the channel 70, where it contacts the first fluid 88 at a dynamic fluid interface 90. The second fluid 86 then drives the first fluid 88 out of the channel 70, through end cover 64, and out of the rotary PX 40. However, because of the short duration of contact, there is minimal mixing between the second fluid 86 and the first fluid 88.

FIG. 2C is an exploded perspective view of an embodiment of a rotary PX 40 (e.g., rotary LPC), according to certain embodiments. In FIG. 2C, the channel 70 has rotated clockwise through an arc of approximately 90 degrees. In this position, the opening 74 (e.g., outlet) is no longer in fluid communication with the apertures 80 and 82 of end cover 66, and the opening 72 is no longer in fluid communication with the apertures 76 and 78 of end cover 64. Accordingly, the low-pressure second fluid 86 is temporarily contained within the channel 70.

FIG. 2D is an exploded perspective view of an embodiment of a rotary PX 40 (e.g., rotary LPC), according to certain embodiments. In FIG. 2D, the channel 70 has rotated through approximately 60 degrees of arc from the position shown in FIG. 2B. The opening 74 is now in fluid communication with aperture 80 in end cover 66, and the opening 72 of the channel 70 is now in fluid communication with aperture 76 of the end cover 64. In this position, high-pressure first fluid 88 enters and pressurizes the low-pressure second fluid 86, driving the second fluid 86 out of the rotor channel 70 and through the aperture 80.

FIG. 2E is an exploded perspective view of an embodiment of a rotary PX 40 (e.g., rotary LPC), according to certain embodiments. In FIG. 2E, the channel 70 has rotated through approximately 270 degrees of arc from the position shown in FIG. 2B. In this position, the opening 74 is no longer in fluid communication with the apertures 80 and 82 of end cover 66, and the opening 72 is no longer in fluid communication with the apertures 76 and 78 of end cover 64. Accordingly, the first fluid 88 is no longer pressurized and is temporarily contained within the channel 70 until the rotor 46 rotates another 90 degrees, starting the cycle over again.

Abrasion and/or erosion damage in a PX may occur when suspended solids are introduced and mixed in the fluid that enters the PX. Abrasion damage may occur when particles enter gaps in the PX (e.g., trapped between a stationary end cover and a rotating end cover). Erosion damage may occur due to existence of suspended solids (e.g., erodents) in high velocity fluid jets (e.g., slurry jets) that are formed due to the high pressure differentials inside the PX. When the high velocity jet makes an impact with components of the PX, the high velocity jet can cause damage to those components. Damage (e.g., erosion damage) can occur when a high pressure rotor port (e.g., rotor duct) opens to a low pressure end cover port (e.g., kidney) or when a low pressure rotor port (e.g., rotor duct) opens to a high pressure end cover port (e.g., kidney) which causes a high pressure differential.

FIGS. 3A-M illustrate PXs 300, according to some embodiments. Hydraulic energy transfer system 110 of one or more of FIGS. 1A-D and/or PX 40 of one or more of FIGS. 2A-E may include one or more features, materials, functionalities, etc. that are the same as or similar to those of FIGS. 3A-M. PXs 300 described in FIGS. 3A-M may include one or more features, materials, functionalities, etc. as described in relation to one or more of FIGS. 1A-2E.

In some embodiments, a PX 300 includes a rotor 310, a sleeve 320, end covers 330A-B, and a carrier plate 340. The rotor 310 is configured to exchange pressure between a first fluid and a second fluid. The sleeve 320 is disposed around the rotor 310. End cover 330A is disposed at a first distal end of the rotor 310. End cover 330B is disposed at a second distal end of the rotor 310.

In some embodiments, the PX 300 includes one or more sealing components configured to prevent leakage between the sleeve 320 and an end cover 330.

FIGS. 3A-M illustrate cartridge sealing and/or alignment in a PX 300. Cartridge of a PX 300 may refer to at least two or more of sleeve 320, first end cover 330A, second end cover 330B, and/or rotor 310. PXs 300 are used in different applications (e.g., seawater reverse osmosis desalination facilities, fracing, refrigeration, etc.) to help make processes economically viable. The PXs 300 of the present disclosure improve performance while providing flow capacity for different applications (e.g., desalination industry, refrigeration industry, fracing industry, etc.).

Sealing the cartridge (e.g., sealing of end covers 330A-B to sleeve 320) of the PX 300 on the exterior at different interfaces increases efficiency of the PX 300. The present disclosure provides sealing of the set of interfaces on both ends of the sleeve of the PX 300 where the sleeve 320 is mating with end covers 330A-B of the PX 300.

The present disclosure may provide sealing (e.g., tightly sealing) of the interfaces between the end covers 330A-B and the sleeve 320 to prevent leakage (e.g., leakage due to pressure differential across the interfaces, leakage due to fluid pressure pushing the end covers 330A-B away from the sleeve 320). With finely lapped interfacial surfaces, such a sealing scheme can prevent leakage when the PX 300 is processing liquids. When the process fluid is a gas or a multi-phase fluid, an active sealing method of the present disclosure (e.g., seal rings 352) may be used to reduce leakage and maintain the performance of the PX 300.

Sealing at the interfaces can be carried out using different methods, such as using a seal ring 352 (e.g., FIGS. 3A-F), flange faces (e.g., flange rings 360 of FIG. 3G), gasket 354 (e.g., O-ring) on the lapped faces, thin gasket 354 between the lapped faces, counter bore on the end cover 330 or rotor 310 along with gasket 354, seal taping the joint (e.g., FIG. 3H), and/or the like.

The end cover/sleeve interfaces (e.g., first interface between a first end cover 330A and the sleeve 320 and the second interface between the second end cover 330B and the sleeve 320) may each have a set of pins 356 (e.g., at least three dowel pins, at least two dowel pins) to align and clock the first and second end covers 330A-B correctly (e.g., align the first end cover 330A with the second end cover 330B). Some active sealing methods prevent visual access to the alignment pins resulting in difficulties with assembly. For ceramic mating parts, the pins 356 (e.g., alignment pins) may be made of plastic material, such as nylon, to prevent damage to ceramic. Inadequate visual access to the alignment pins during assembly can cause damage to the pin holes or produce shavings of plastic that can enter the radial or axial bearing gaps. This can result in artificially high bearing gaps or increase frictional torque in the bearings. To avoid these issues and allow for ease of alignment, the present disclosure includes a method incorporating external alignment holes or slots (e.g., radial holes, radial recesses) on different mating parts (e.g., end cover 330, sleeve 320).

In some embodiments, components of the present disclosure include seal rings 352 and pins 356 (e.g., alignment dowel pins).

New component seal rings 352, each with a pair of radial gaskets 354 (e.g., O-rings) may be used at the end cover/sleeve interfaces to prevent leakage of the process fluids. Seal rings 352 are assembled at the interface between end cover 330 and sleeve 320 (e.g., see FIGS. 3A-F). A shallow groove machined at either end of the interface on the sleeve 320 and the end covers 330A-B positions the seal ring 352 and prevents the seal ring 352 from moving axially.

A pair of pins 356 (e.g., alignment dowel pins) mounted on the outer surface of the end covers 330A-B and the sleeve 320 mate with the corresponding slots on the seal ring 352, allowing for clocking (e.g., precise clocking) of the end cover 330 with respect to the sleeve 320. This allows for ease of assembly as well as provides direct visual access for mating the components. Pins 356 (e.g., alignment pins) may reduce or eliminate relative motion (e.g., make sure that there is no relative motion) between the seal ring 352 and end cover 330 and between seal ring 352 and sleeve 320 in the circumferential direction. In some embodiments, pins 356 (e.g., alignment pins) in the axial direction in some previous configurations may not be used since visual access is blocked due to the seal rings.

Figure 3D:
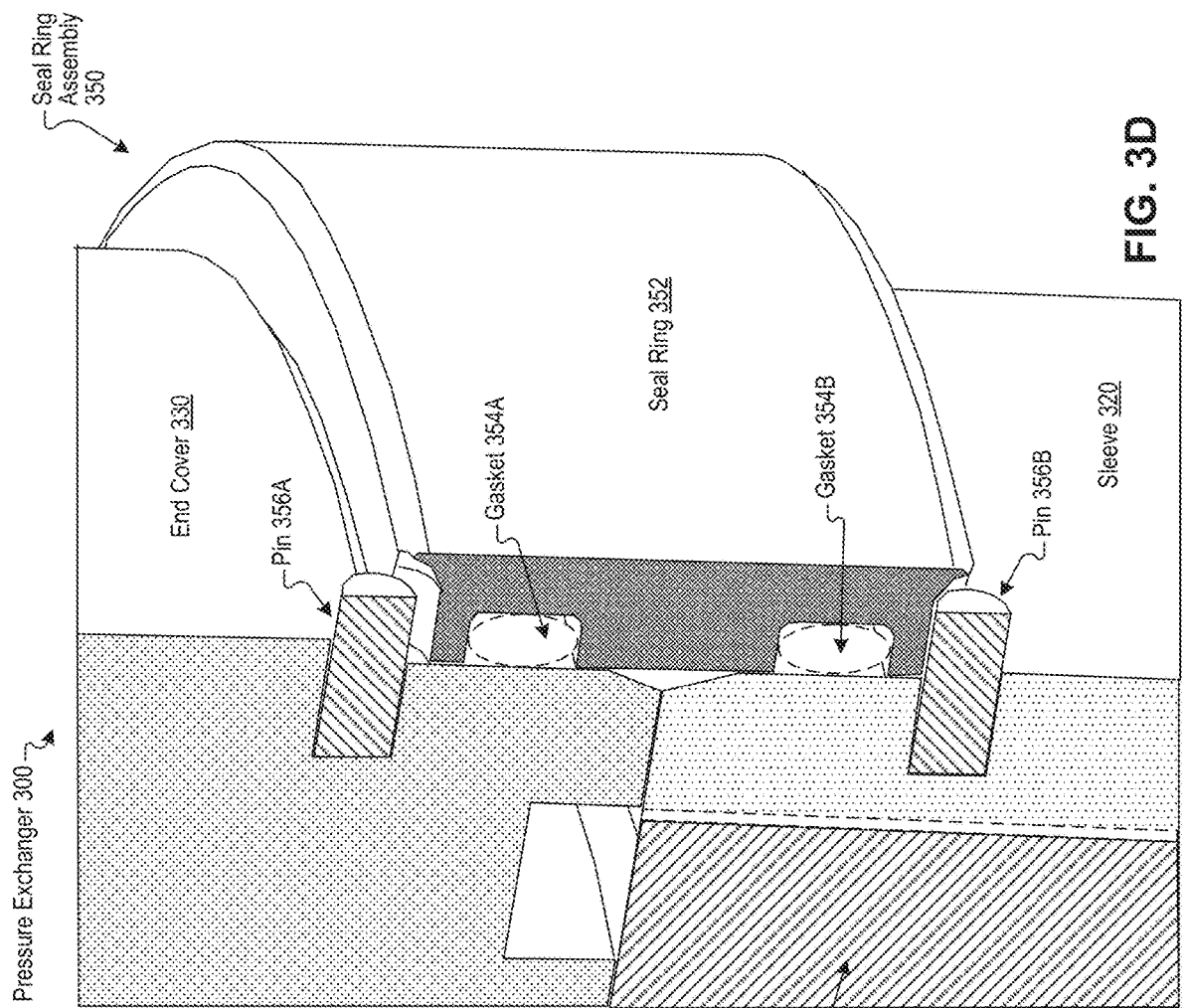
Figure 3C:
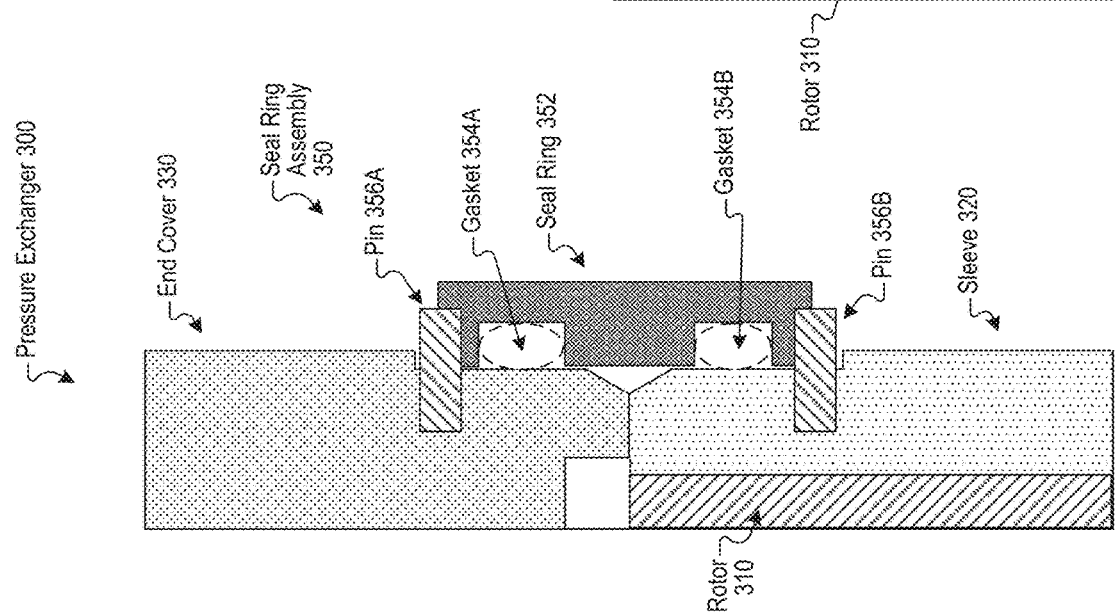

FIG. 3A illustrates a front view of a PX 300 including seal rings 352A-B, according to certain embodiments. FIG. 3B illustrates a front cross-sectional view of a PX 300 including seal rings 352A-B (e.g., PX 300 of FIG. 3A), according to certain embodiments. FIG. 3C illustrates an enlarged front cross-sectional view of a PX 300 including a seal ring 352 (e.g., PX 300 of FIGS. 3A and/or 3B), according to certain embodiments. FIG. 3D illustrates a perspective cross-sectional view of a PX 300 including a seal ring 352 (e.g., PX 300 of one or more of FIGS. 3A-C), according to certain embodiments. The PX 300 of the present disclosure may reduce leakage, provide better alignment of end covers 330, and/or may have a greater ease of assembly compared to conventional systems.

The one or more sealing components may include a seal ring assembly 350 including a seal ring 352 disposed around one or more components of the PX 300, a gasket 354 disposed between the seal ring 352 and the end cover 330, and a gasket 354 disposed between the seal ring 352 and the sleeve 320. The seal ring 352 may be metal (e.g., stainless steel, brass, etc.). The gasket 354 may be an elastomer.

In some embodiments, the one or more sealing components may include a seal ring assembly 350A (e.g., including seal ring 352A) disposed around the interface between end cover 330A and sleeve 320 (e.g., to prevent leakage between the sleeve 320 and end cover 330A) and a seal ring assembly 350B (e.g., including seal ring 352B) disposed around the interface between end cover 330B and sleeve 320 (e.g., to prevent leakage between the sleeve 320 and end cover 330B).

In some embodiments, the PX 300 includes one or more alignment components configured to align one or more components of the PX 300. In some embodiments, the one or more alignment components align the end cover 330A with at least one of the sleeve 320 or the end cover 330B. In some embodiments, the one or more alignment components align the end cover 330A with the end cover 330B.

In some embodiments, the one or more alignment components include a pin 356A and pin 356B. Pin 356A is disposed in an end cover recess formed by an end cover outer surface of end cover 330. Pin 356A may engage with a seal ring upper recess formed by an upper surface of the seal ring 352. Pin 356B is disposed in a sleeve recess formed by a sleeve outer surface of the sleeve 320. Pin 356B engages with a seal ring lower recess formed by a lower surface of the seal ring 352.

Pins 356 may be plastic. Pins 356 may be metal (e.g., steel, brass, etc.). Pins 356 may be dowel pins (e.g., straight solid pin that has a chamfered end to aid with insertion and alignment, cylindrical-shaped solid pin). Pins 356 may be alignment pins. Pins 356 may be radial pins inserted radially into side surfaces of components. Pins 356 may be disposed in dovetail grooves formed by components of PX 300.

For each pin 356 shown in each cross-sectional view in the FIGS., there may be at least three pins 356 disposed around (e.g., substantially equally located around) the PX 300 (e.g., three pins 356A disposed around end cover 330A, three pins 356 disposed around end cover 330A, three pins 356B disposed around upper portion of sleeve 320, three pins 356 disposed around lower portion of sleeve 320).

In some embodiments, PX 300 includes alignment components (e.g., pins 356) configured to align end cover 330A with the end cover 330B. The alignment components may include first alignment components inserted radially into end cover 330A and second alignment components inserted radially into 330B end cover.

In some embodiments, the first alignment components engage with sealing ring 352A (e.g., sealing ring 352A being disposed around a first interface between end cover 330A and sleeve 320). The second alignment components may engage with sealing ring 352B (e.g., sealing ring 352B being disposed around a second interface between the end cover 330B and the sleeve 320).

In some embodiments, PX 300 includes a rotor 310, sleeve 320, end covers 330A-B, and sealing components. In some embodiments, PX 300 includes a rotor 310, sleeve 320, end covers 330A-B, and alignment components. In some embodiments, PX 300 includes sleeve 320, end covers 330A-B, sealing components, and alignment components.

In some embodiments, seal ring assembly 350 (e.g., pressure exchanger seal ring assembly) includes a seal ring 352, gaskets 354A-B, and/or pins 356A-B.

The seal ring 352 may include an inner surface forming a first groove and a second groove. Gasket 354A may be configured to be disposed in the first groove and gasket 354B may be configured to be disposed in the second groove. The seal ring assembly 350 is to be disposed around an interface between an end cover 330 and a sleeve 320 to prevent leakage between the sleeve 320 and the end cover 330. Gasket 354A is to interface with an end cover outer surface of the end cover 330 and gasket 354B is to interface with a sleeve outer surface of the sleeve 320.

Pin 356A includes a first distal end configured to be disposed in an upper seal ring recess formed by an upper surface of the seal ring 352. Pin 356B further includes a second distal end configured to be inserted radially into an end cover recess formed by the end cover outer surface of the end cover 330.

Pin 356B includes a first distal end configured to be disposed in a lower seal ring recess formed by a lower surface of the seal ring 352. Pin 356B includes a second distal end configured to be inserted radially into a sleeve recess formed by the sleeve outer surface of the sleeve 320.

In some embodiments, gasket 354A is a first O-ring and gasket 354B is a second O-ring. In some embodiments, gasket 354 is a hollow O-ring. In some embodiments, gasket 354 is a solid O-ring. In some embodiments, gasket 354 has a circular perimeter. In some embodiments, gasket 354 has a rectangular (e.g., square) perimeter.

In some embodiments, pin 356 is plastic. In some embodiments, pin 356 is nylon.

In some embodiments, PX 300 is configured to exchange pressure between a first fluid and a second fluid, where the first and second fluids are refrigerant. In some embodiments, the sealing components (e.g., gaskets 354, etc.) prevent leakage of fluid (e.g., gas, liquid) into the PX 300 and/or prevent leakage of fluid (e.g., gas, liquid, refrigerant) out of the PX 300.

Referring to FIG. 3C, end cover 330 may have a distal end that has a smaller diameter (e.g., forms a recess) than a remaining portion of end cover 330 and/or sleeve 320 may have a distal end that has a smaller diameter (e.g., forms a recess) than the central portion of sleeve 320. The seal ring 352 may be disposed in the smaller-diameter portion (e.g., recess).

Referring to FIG. 3D, seal ring 352 may extend around the PX 300 at the interface between the end cover 330 and sleeve 320. In some embodiments, pins 356A (e.g., three pins 356A equally distanced) may be inserted into end cover 330 and then seal ring 352 may be slid onto the bottom portion of the end cover 330 to abut pins 356A. pins 356B may be inserted into sleeve 320 and then the seal ring 352 attached to end cover 330 may be slid onto the upper portion of sleeve 320.

FIG. 3E illustrates a front view of a PX 300 including a seal rings 352, according to certain embodiments. FIG. 3F illustrates a front cross-sectional view of a PX 300 including a seal ring 352 (e.g., PX 300 of FIG. 3E), according to certain embodiments.

In some embodiments, the one or more sealing components include a single seal ring 352 that is disposed over the interface between the end cover 330A and sleeve 320 and the interface between the end cover 330B and sleeve 320 (e.g., the single seal ring 352 extends from end cover 330A to end cover 330B).

Figure 3G:
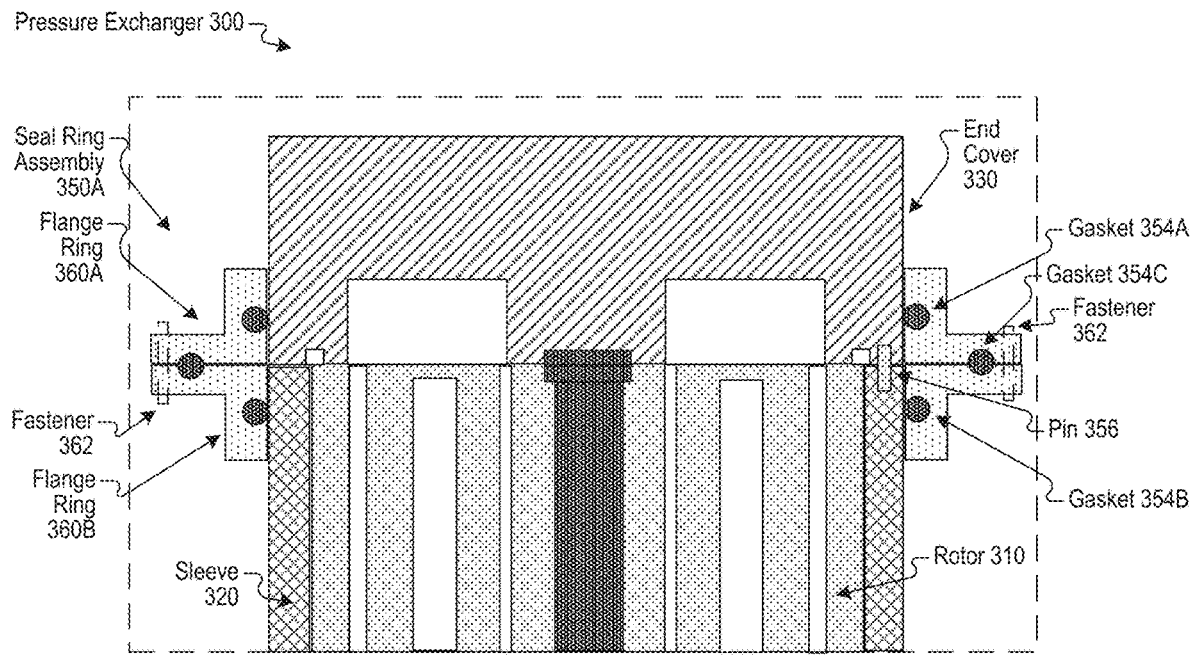

FIG. 3G illustrates a PX (e.g., a flange design), according to certain embodiments.

In some embodiments, the one or more first sealing components (e.g., seal ring assembly 350) include a flange rings 360A-B and gaskets 354A-C. Flange ring 360A is coupled to (e.g., disposed around) an end cover outer surface of end cover 330. Flange ring 360B is coupled to (e.g., disposed around) a sleeve outer surface of the sleeve 320. Gasket 354A is disposed between flange ring 360A and end cover 330. Gasket 354B is disposed between flange ring 360B and sleeve 320. Gasket 354C is disposed between flange ring 360A and flange ring 360B. The flange rings 360A-B and gaskets 354A-C may prevent leakage into and/or out of PX 300 (e.g., at the interface between end cover 330 and sleeve 320).

In some embodiments, one or more fasteners 362 (e.g., bolt, screw, pin, etc.) may connect flange ring 360A and flange ring 360B.

A pin 356 may be disposed between an upper surface of sleeve 320 and a lower surface of end cover 330 (e.g., a first distal end of pin 356 is disposed in a recess formed by lower surface of end cover 330 and a second distal end of pin 356 is disposed in a recess formed by an upper surface of sleeve 320.

Figure 3H:
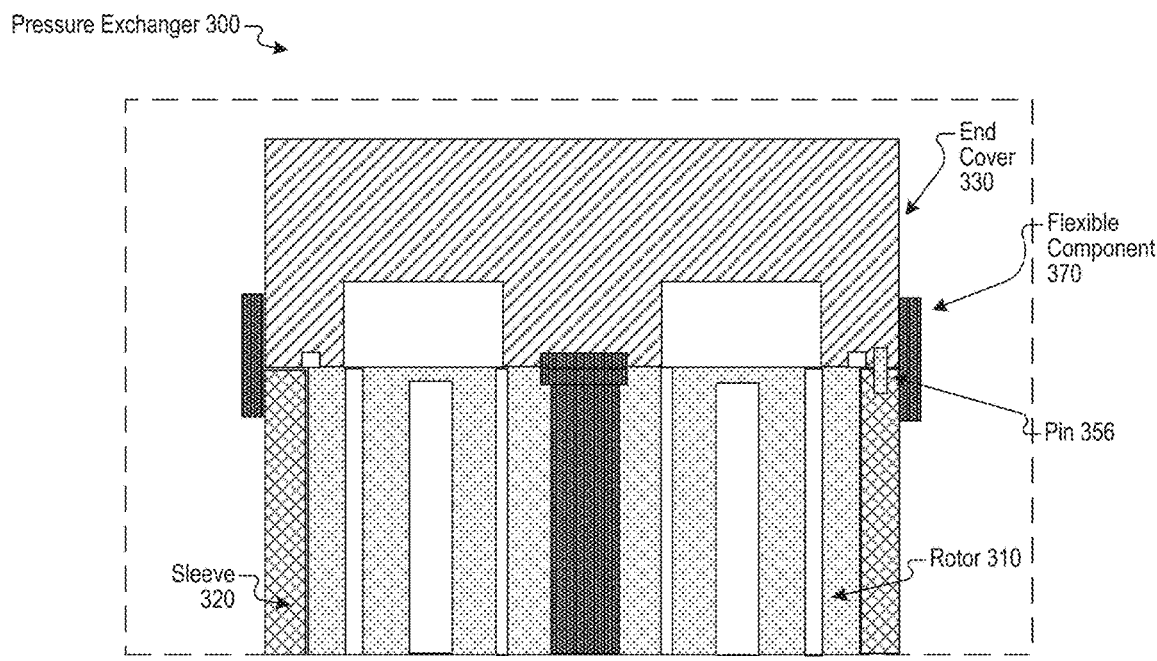

FIG. 3H illustrates a PX (e.g., with tape on the interface, tape wrapped around the interface), according to certain embodiments.

In some embodiments, the one or more sealing components include a flexible component 370 (e.g., tape, substrate with adhesive on one side) adhered to a portion of the pressure exchanger including an interface between the end cover 330 and the sleeve 320. The flexible component 370 may prevent leakage into and/or out of PX 300 (e.g., at the interface between end cover 330 and sleeve 320).

A pin 356 may be disposed between an upper surface of sleeve 320 and a lower surface of end cover 330 (e.g., a first distal end of pin 356 is disposed in a recess formed by lower surface of end cover 330 and a second distal end of pin 356 is disposed in a recess formed by an upper surface of sleeve 320.

Figure 3I:
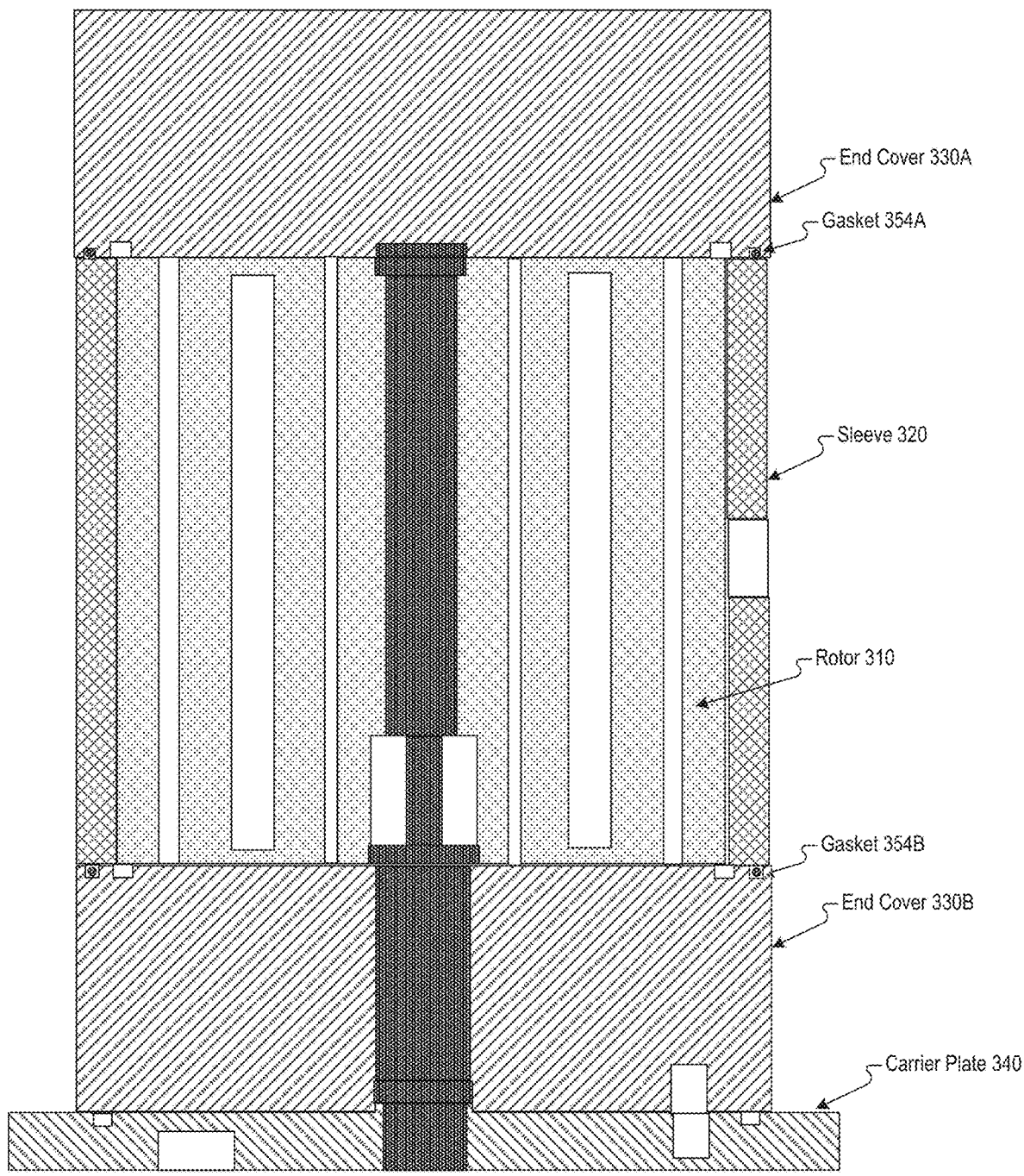
Figure 3J:
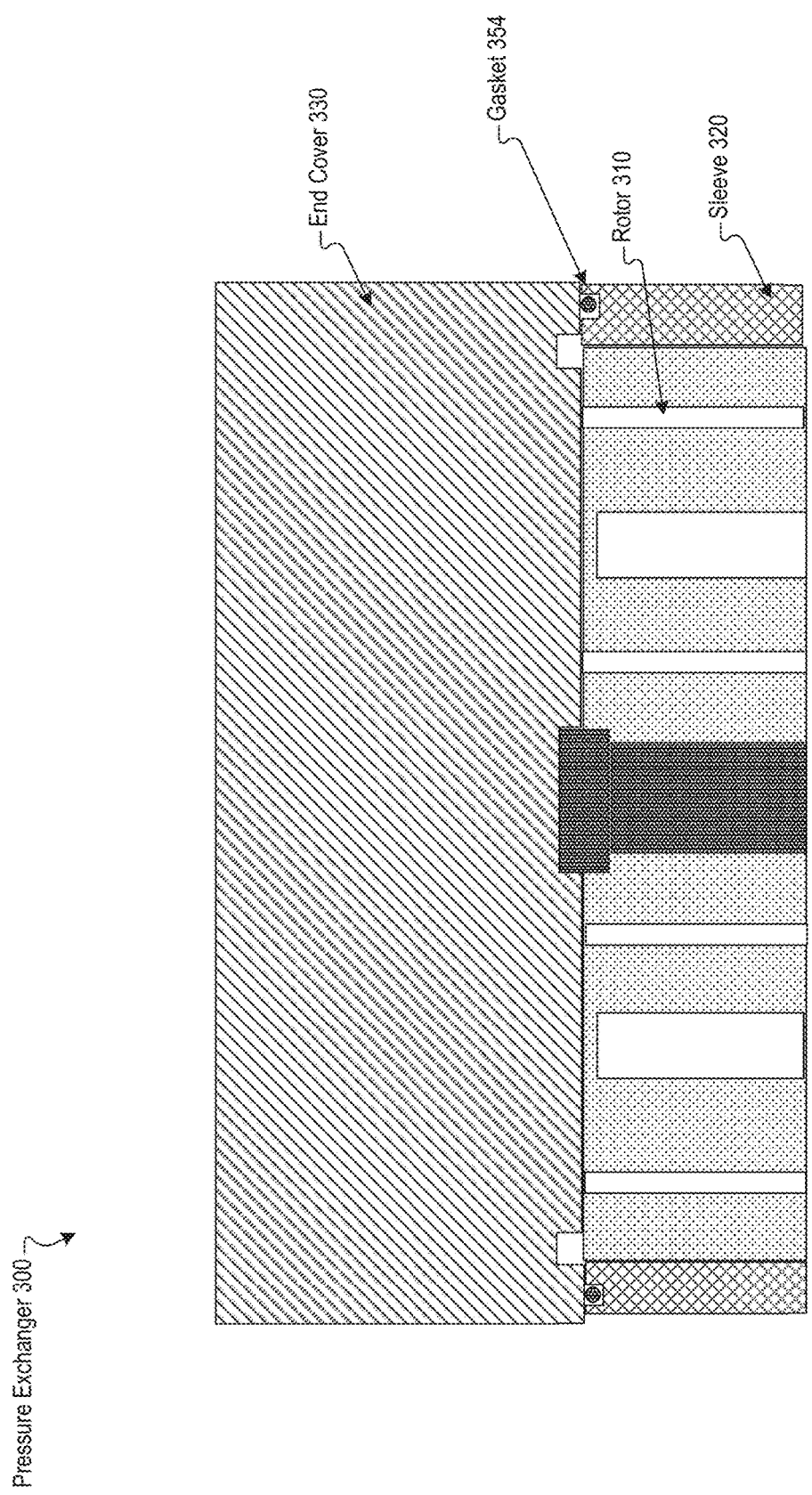

FIG. 3I illustrates a PX (e.g., with an O-ring disposed in a groove formed by the end cover between the end cover and the sleeve), according to certain embodiments. FIG. 3J illustrates a PX (e.g., with an O-ring disposed in a groove formed by the sleeve between the end cover and the sleeve), according to certain embodiments.

In some embodiments, the one or more first sealing components include a gasket 354A (e.g., O-ring) disposed between a lower surface of the end cover 330A and an upper surface of the sleeve 320 and a gasket 354B disposed between a lower surface of sleeve 320 and an upper surface of end cover 330B. Referring to FIG. 3I, gasket 354A may be disposed in a recess formed by a lower surface of end cover 330A and gasket 354B may be disposed in a recess formed by an upper surface of end cover 330B. Referring to FIG. 3J, gasket 354 may be disposed in a recess formed by an upper surface of sleeve 320 (e.g., a second gasket 354 may be disposed in a recess formed by a lower surface of sleeve 320).

Figure 3K:
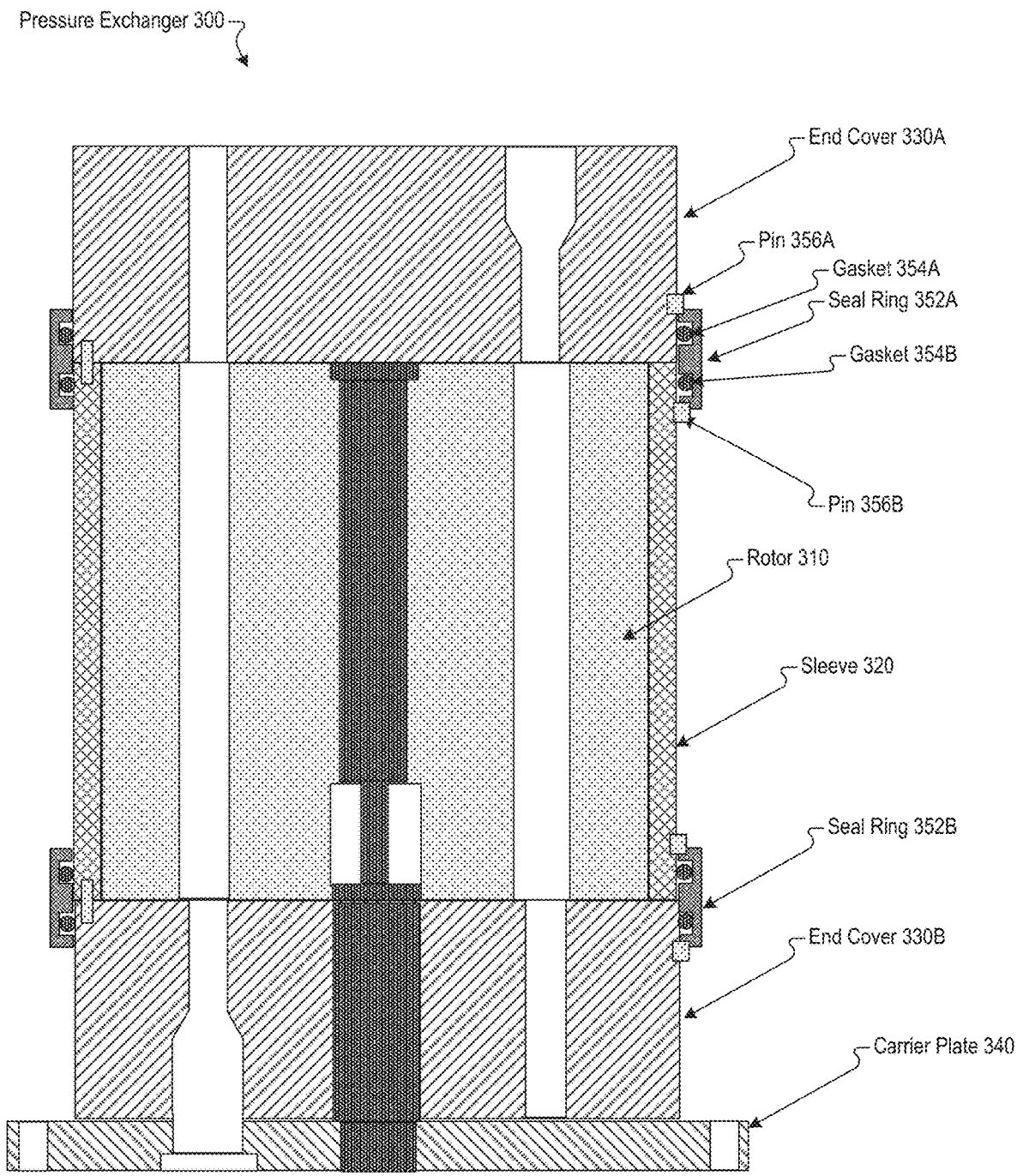

FIG. 3K illustrates a PX (e.g., with alignment pins using slots), according to certain embodiments. Pins 356 may be disposed in slots formed by PX 300 (e.g., slots formed by end covers 330A-B and sleeve 320).

FIGS. 3L-M illustrate PXs (e.g., with radial seal rings incorporated into end covers or sleeve), according to certain embodiments.

Referring to FIG. 3L, in some embodiments, each end cover 330 has an overlapping portion that overlaps a sleeve outer surface of the sleeve 320. The one or more sealing components include a gasket 354 disposed between an inner surface of the overlapping portion of the end cover 330 and the sleeve outer surface of sleeve 320. A pin 356 includes a first distal end disposed in a recess formed by the inner surface of the overlapping portion of the end cover 330 and a second distal end disposed in a recess formed by the sleeve outer surface of sleeve 320.

In some embodiments, the sleeve 320 may seal against a side surface of the end cover 330 or against a distal end of the end cover 330.

Referring to FIG. 3M, in some embodiments, the sleeve 320 overlaps an end cover outer surface of the end cover 330. The one or more sealing components include a gasket 354 disposed between an inner surface of the sleeve 320 and the end cover outer surface of the end cover 330. A pin 356 includes a first distal end disposed in a recess formed by the inner surface of the sleeve 320 and a second distal end disposed in a recess formed by the end cover outer surface of the end cover 330.

The present disclosure may include a new device (e.g., PX seal ring assembly) that may be used on an existing piece of equipment or a new piece of equipment.

Conventional systems may not have any device/mechanism to prevent leakage between the end cover and sleeve which results in lower efficiency. To prevent the relative motion between sleeve and end cover (e.g., solutions that do not have seal rings), alignment pins in the axial direction may be used.

The present disclosure may be configured to enable the application of a pressure exchanger in a refrigeration system (e.g., transcritical carbon dioxide ($CO_2$) refrigeration system). However, the present disclosure may be used in any application of a pressure exchanger in any field.

The present disclosure may enable the use of gaseous or multi-phase fluids at high pressures in the pressure exchanger by providing a leak proof seal (e.g., substantially leak proof seal).

The present disclosure (e.g., one or more embodiments of FIGS. 3A-M) may have improvement in one or more of pressure range, efficiency, reduction in volume and cost, etc. compared to conventional solutions.

The preceding description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. Descriptions of systems herein may include descriptions of one or more optional components. Components may be included in combinations not specifically discussed in this disclosure, and still be within the scope of this disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about," "substantially," or "approximately" is used herein, this is intended to mean that the nominal value presented is precise within ±10%. Also, the terms "first," "second," "third," "fourth," etc. as used herein are meant as labels to distinguish among different elements and can not necessarily have an ordinal meaning according to their numerical designation.

The terms "over," "under," "between," "disposed on," "before," "after," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers or components.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which each claim is entitled.

What is claimed is:

1. A pressure exchanger comprising:
   a rotor configured to exchange pressure between a first fluid and a second fluid;
   a sleeve disposed around the rotor;
   a first end cover disposed at a first distal end of the rotor;
   a second end cover disposed at a second distal end of the rotor; and
   a plurality of pins configured to align the first end cover with the second end cover;
   a first flange ring coupled to an end cover outer surface of the first end cover;
   a second flange ring coupled to a sleeve outer surface of the sleeve;
   a first gasket disposed between the first flange ring and the first end cover;
   a second gasket disposed between the second flange ring and the sleeve; and
   a third gasket disposed between the first flange ring and the second flange ring.

2. The pressure exchanger of claim 1, wherein the plurality of pins comprise one or more first pins inserted into the first end cover and one or more second pins inserted into the second end cover.

3. The pressure exchanger of claim 1, wherein the first flange ring, the second flange ring, the first gasket, the second gasket, and the third gasket are configured to prevent leakage between the sleeve and the first end cover.

4. The pressure exchanger of claim 1, wherein:
   a first distal end of a first pin of the plurality of pins is disposed in a first sleeve recess formed by the sleeve;
   a second distal end of the first pin is disposed in a first end cover recess formed by the first end cover;
   a third distal end of a second pin of the plurality of pins is disposed in a second sleeve recess formed by the sleeve; and
   a fourth distal end of the second pin is disposed in a second end cover recess formed by the second end cover.

5. A pressure exchanger comprising:
   a rotor configured to exchange pressure between a first fluid and a second fluid;
   a sleeve disposed around the rotor;
   a first end cover disposed at a first distal end of the rotor; and
   one or more first sealing components configured to prevent leakage between the sleeve and the first end cover, wherein the one or more first sealing components comprise:
     a first flange ring coupled to an end cover outer surface of the first end cover;
     a second flange ring coupled to a sleeve outer surface of the sleeve;
     a first gasket disposed between the first flange ring and the first end cover;
     a second gasket disposed between the second flange ring and the sleeve; and
     a third gasket disposed between the first flange ring and the second flange ring.

6. The pressure exchanger of claim 5 further comprising a second end cover disposed at a second distal end of the rotor.

7. A pressure exchanger comprising:
   a rotor configured to exchange pressure between a first fluid and a second fluid;
   a sleeve disposed around the rotor;
   a first end cover disposed at a first distal end of the rotor;
   one or more first pins, wherein each of the one or more first pins comprises a corresponding first end disposed in a corresponding sleeve recess formed by the sleeve and a corresponding second end disposed in a corresponding end cover recess formed by the first end cover;
   one or more first sealing components that cover spacing between the sleeve and the first end cover and are configured to prevent leakage between the sleeve and the first end cover, wherein the one or more first sealing components comprise:
     a seal ring disposed around the pressure exchanger;
     a first gasket disposed between the seal ring and the first end cover; and
     a second gasket disposed between the seal ring and the sleeve;
   a second pin disposed in an end cover recess formed by an end cover outer surface of the first end cover, wherein the second pin engages with a seal ring upper recess formed by an upper surface of the seal ring; and
   a third pin disposed in a sleeve recess formed by a sleeve outer surface of the sleeve, wherein the third pin engages with a seal ring lower recess formed by a lower surface of the seal ring.

8. The pressure exchanger of claim 7, wherein the one or more first pins are configured to align the first end cover with the sleeve.

9. The pressure exchanger of claim 7 further comprising:
   a second end cover disposed at a second distal end of the rotor; and
   one or more second sealing components configured to prevent leakage between the sleeve and the second end cover.

10. The pressure exchanger of claim 7, wherein the one or more first sealing components comprise a flexible component adhered to a portion of the pressure exchanger comprising an interface between the first end cover and the sleeve.

11. The pressure exchanger of claim 7, wherein the one or more first sealing components comprise a third gasket disposed between a lower surface of the first end cover and an upper surface of the sleeve.

12. A pressure exchanger comprising:
   a rotor configured to exchange pressure between a first fluid and a second fluid;
   a sleeve disposed around the rotor;
   a first end cover disposed at a first distal end of the rotor;
   a second end cover disposed at a second distal end of the rotor; and
   a plurality of pins configured to align the first end cover with the second end cover, wherein the plurality of pins comprise:
     a first pin, wherein a first distal end of the first pin is disposed in a first sleeve recess formed by the sleeve, and wherein a second distal end of the first pin is disposed in a first end cover recess formed by the first end cover;
     a second pin, wherein a third distal end of the second pin is disposed in a second sleeve recess formed by the sleeve, and wherein a fourth distal end of the second pin is disposed in a second end cover recess formed by the second end cover;
     third pins that engage with a first sealing ring, the first sealing ring being disposed around a first interface between the first end cover and the sleeve; and fourth pins that engage with a second sealing ring, the second sealing ring being disposed around a second interface between the second end cover and the sleeve.

13. The pressure exchanger of claim 12 further comprising:
one or more first sealing components that cover spacing between the sleeve and the first end cover and are configured to prevent leakage between the sleeve and the first end cover, the one or more first sealing components comprising the first sealing ring; and
one or more second sealing components that cover spacing between the sleeve and the second end cover and are configured to prevent leakage between the sleeve and the second end cover, the one or more second sealing components comprising the second sealing ring.

14. The pressure exchanger of claim 13, wherein the one or more first sealing components comprise:
a first gasket disposed between the first sealing ring and the first end cover; and
a second gasket disposed between the first sealing ring and the sleeve.

\* \* \* \* \*